US008237991B2

(12) United States Patent
Ono et al.

(10) Patent No.: US 8,237,991 B2
(45) Date of Patent: Aug. 7, 2012

(54) IMAGE PROCESSING APPARATUS, IMAGE PROCESSING METHOD, AND PROGRAM

(75) Inventors: Mitsuhiro Ono, Tokyo (JP); Fumitaka Goto, Tokyo (JP); Fumihiro Goto, Kawasaki (JP); Masao Kato, Kawasaki (JP); Akitoshi Yamada, Yokohama (JP); Tetsuya Suwa, Yokohama (JP); Yusuke Hashii, Kawasaki (JP); Arata Miyagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/843,537

(22) Filed: Jul. 26, 2010

(65) Prior Publication Data

US 2010/0290090 A1     Nov. 18, 2010

Related U.S. Application Data

(63) Continuation of application No. 11/771,168, filed on Jun. 29, 2007.

(30) Foreign Application Priority Data

Jul. 4, 2006   (JP) ................................. 2006-184846

(51) Int. Cl.
*G06T 5/00* (2006.01)
*H04N 1/407* (2006.01)
*H04N 1/409* (2006.01)

(52) U.S. Cl. ........ 358/3.27; 358/1.9; 358/3.26; 358/532; 358/533; 382/254; 382/257; 382/266; 382/268; 382/269

(58) Field of Classification Search .................. 358/1.9, 358/3.26–3.27, 532–533; 382/254–269
See application file for complete search history.

(56) References Cited

U.S. PATENT DOCUMENTS

| 5,257,182 | A | * | 10/1993 | Luck et al. ..................... 382/224 |
| 5,321,769 | A | * | 6/1994 | Takahashi et al. ............. 382/174 |
| 5,668,888 | A | * | 9/1997 | Doi et al. ....................... 382/132 |
| 6,005,978 | A | * | 12/1999 | Garakani ........................ 382/218 |

(Continued)

FOREIGN PATENT DOCUMENTS

JP     2275589     * 11/1990

(Continued)

OTHER PUBLICATIONS

Krishnapuram, "Morphological Methods for Detection and Classification of Edges in Range Images", Journal of Mathematical Imaging and Vision 2, 351-375 (1992).*

(Continued)

*Primary Examiner* — Richard Zhu
(74) *Attorney, Agent, or Firm* — Fitzpatrick, Cella, Harper & Scinto

(57) ABSTRACT

In order to eliminate image deterioration based on the characteristics of an output device upon execution of edge emphasis processing, an image processing apparatus includes a setting unit which sets a print characteristic on the print medium, a region setting unit which sets a region, a brightness value derivation unit which derives brightness values, a first derivative derivation which derives first derivatives of the brightness values, an edge direction determination unit which determines an edge direction of brightness, an emphasis level determination unit which determines an emphasis level of a pixel value based on the first derivatives, and a replacement unit which calculates second derivatives of brightness values and replaces a pixel value of a pixel of interest based on the sign of the second derivative.

11 Claims, 20 Drawing Sheets

U.S. PATENT DOCUMENTS

| | | | | |
|---|---|---|---|---|
| 6,073,849 | A | * | 6/2000 | Colley et al. ............. 235/462.27 |
| 6,088,130 | A | * | 7/2000 | Matsukubo ................... 358/447 |
| 6,191,874 | B1 | * | 2/2001 | Yamada et al. ............... 358/529 |
| 6,292,621 | B1 | * | 9/2001 | Tanaka et al. ................ 386/287 |
| 6,392,759 | B1 | * | 5/2002 | Kuwata et al. ................. 358/1.9 |
| 6,600,832 | B1 | * | 7/2003 | Nakayama et al. .......... 382/162 |
| 6,606,421 | B1 | * | 8/2003 | Shaked et al. ................ 382/275 |
| 6,608,926 | B1 | * | 8/2003 | Suwa et al. ................... 382/162 |
| 6,665,439 | B1 | * | 12/2003 | Takahashi ..................... 382/199 |
| 6,694,051 | B1 | * | 2/2004 | Yamazoe et al. ............. 382/167 |
| 6,717,698 | B1 | * | 4/2004 | Lee ................................ 358/1.9 |
| 6,735,341 | B1 | * | 5/2004 | Horie et al. ................... 382/239 |
| 6,834,124 | B1 | * | 12/2004 | Lin et al. ....................... 382/261 |
| 6,847,738 | B1 | * | 1/2005 | Scognamiglio et al. ...... 382/260 |
| 6,850,341 | B1 | * | 2/2005 | Ito .................................. 358/1.9 |
| 6,868,175 | B1 | * | 3/2005 | Yamamoto et al. ........... 382/145 |
| 6,885,771 | B2 | * | 4/2005 | Takahashi ..................... 382/199 |
| 7,020,314 | B1 | * | 3/2006 | Suri et al. ...................... 382/130 |
| 7,020,329 | B2 | * | 3/2006 | Prempraneerach et al. .. 382/164 |
| 7,020,332 | B2 | * | 3/2006 | Nenonen et al. .............. 382/169 |
| 7,130,469 | B2 | * | 10/2006 | Adachi .......................... 382/224 |
| 7,231,072 | B2 | * | 6/2007 | Yamano et al. ............... 382/128 |
| 7,508,541 | B2 | * | 3/2009 | Ishiguro ......................... 358/1.9 |
| 7,522,314 | B2 | * | 4/2009 | Atkins ........................... 358/3.27 |
| 2004/0196408 | A1 | * | 10/2004 | Ishikawa et al. .............. 348/616 |
| 2005/0134892 | A1 | * | 6/2005 | Goto et al. .................... 358/1.13 |
| 2005/0244052 | A1 | * | 11/2005 | Keshet et al. ................. 382/162 |

FOREIGN PATENT DOCUMENTS

| | | | |
|---|---|---|---|
| JP | 07288768 | A * | 10/1995 |
| JP | 2004056262 | A * | 2/2004 |

OTHER PUBLICATIONS

Krishnapuram et al, "Morphological Methods for Detection and Classification of Edges in Range Images", Journal of Mathematical Imaging and Vision 2, 351-75, 1992.*

Raghu Krishnapuram et al. "Morphological Methods for Detection and Classification of Edges in Range Images", 1992, Journal of Mathematical Imaging and Vision 2, 351-375, Kluwer Academic Publishers.*

Bw Reutter et al., "Computationally Efficient Nonlinear Edge PReserving Smoothing of n-D Medical Images Via Scale Space Fingerprint Analysis", 2000, IEEE Nuclear Science Symposium and Medical Imaging Conference Record.*

Linan Fan et al, "Research on Edge Detection of Gray Scale IMage Corrupted by Noise Based on Multi-structuring Elements", 2003, IEEE.*

JGM Schavemaker et al., "Image Sharpening by morphological filtering", 2000, Journal of the Pattern Recognition Society.*

* cited by examiner 801  802

FIG. 16

| PRINT MEDIUM TYPE | Lap CHANGE AMOUNT |
|---|---|
| PLAIN PAPER | 80 |
| SPECIFIC PAPER A | 20 |
| SPECIFIC PAPER B | 10 |
| SPECIFIC PAPER C | 30 |
| SPECIFIC PAPER D | 20 |

FIG. 17

| CHARACTER LINE WIDTH | Lap CHANGE AMOUNT |
|---|---|
| +2 | -80 |
| +1 | -40 |
| 0 | 0 |
| -1 | 40 |
| -2 | 80 |

FIG. 19

| Lap SIGN OF PIXEL OF INTEREST | + | − |  |  |  |
|---|---|---|---|---|---|
| TOTAL Lap SIGN OF PREVIOUS AND NEXT PIXELS |  |  | + | − | 0 |
| REPLACEMENT PIXEL POSITION | MINIMUM Y | MAXIMUM Y | MINIMUM Y | MAXIMUM Y | MAXIMUM Y |

IMAGE PROCESSING APPARATUS, IMAGE PROCESSING METHOD, AND PROGRAM

CROSS REFERENCE TO RELATED APPLICATION

This application is a continuation of application Ser. No. 11/771,168, filed Jun. 29, 2007, pending.

BACKGROUND OF THE INVENTION

1. Field of the Invention

The present invention relates to an image processing technique and, more particularly, to an edge emphasis technique of image data based on the image printing characteristic.

2. Description of the Related Art

A copying machine which optically scans a document image and prints a scanned image on a print medium such as a paper sheet or the like is known. In general, the edge of an image optically scanned by a scanning unit (scanner) of a copying machine is smoother than that of a document image. For this reason, an image with poor sharpness is output when the scanned image is printed on a print medium intact.

Hence, Japanese Patent No. 2620368 (reference 1) discloses an image signal processing method with the following characteristic feature. That is, in this method, when the distribution pattern of an image signal at a point of interest is convex upward, a signal replaced by an image emphasis signal larger than an image signal at the point of interest is output; when the distribution pattern is convex downward, a signal replaced by an image emphasis signal smaller than the image signal at the point of interest is output; otherwise, a signal replaced by an original image signal or unsharp signal is output. Also, Japanese Patent Laid-Open No. 07-288768 (reference 2) discloses a video signal processing method which replaces the level of a pixel of interest of an image by a replacement level generated using the pixel of interest and pixels which neighbor the pixel of interest. Furthermore, Japanese Patent Laid-Open No. 2004-056252 (reference 3) discloses a method which avoids not only poor sharpness described above but also troubles such as dot omission and disappearance of thin lines at a reduction scale by changing the resolution of a data input device or output device.

However, upon applying edge emphasis by the aforementioned method, the output image quality the user desired cannot always be improved. FIG. 8 illustrates a state in which edge emphasis processing is applied to image data including a bold character. Reference numeral 801 denotes an unprocessed image immediately after a document image is scanned; and 802, an image upon printing an image that has undergone the edge emphasis processing on a print medium. As can be seen from FIG. 8, application of the edge emphasis processing results in an illegible character since the spacings of black parts of the character are narrowed down.

This problem arises from the difference of an expression region of a pixel as a unit of image processing between the image processing such as edge emphasis and the like and an output device including a print process that reproduces the image. In particular, this problem occurs prominently when a bold character as the type of character is scanned or when a document image includes a complicated kanji character (that with a large number of strokes). Also, an ink-jet printer causes ink bleeding on a print medium, and the problem of illegibility due to character collapse appears conspicuously. Since the problem of ink bleeding depends on the characteristics of inks and print media, it varies depending on different inks and print media or their combinations.

For this reason, the techniques disclosed in references 1 and 2 above cannot solve these problems. When both the input and output devices have a sufficiently high degree of freedom in settings in association with the resolution, the technique disclosed in reference 2 can eliminate the aforementioned problems. However, the device cost increases considerably.

SUMMARY OF THE INVENTION

The present invention has been made in consideration of the aforementioned problems, and has as its object to solve at least one of the aforementioned problems.

According to one aspect of the present invention, an image processing apparatus for processing image data to be printed on a print medium by an image printing unit, comprising: a setting unit adapted to set a print characteristic on the print medium in the image printing unit; a region setting unit adapted to set a region configured by a plurality of pixels including a pixel of interest; a brightness value derivation unit adapted to derive brightness values of the pixels in the region; a first derivative derivation unit adapted to derive first derivatives of the brightness values derived by the brightness value derivation unit for a plurality of pixel sequences in different directions, which include the pixel of interest; an edge direction determination unit adapted to determine an edge direction of brightness at a position of the pixel of interest based on the results of the first derivatives at positions of the pixel of interest in the respective pixel sequences derived by the first derivative derivation unit; an emphasis level determination unit adapted to determine an emphasis level of a pixel value based on the print characteristic and the first derivatives at respective positions of a plurality of pixels which line up in the edge direction determined by the edge direction determination unit; and a replacement unit adapted to calculate second derivatives of brightness values at respective positions of the plurality of pixels which line up in the edge direction determined by the edge direction determination unit, to replace a pixel value of the pixel of interest by a pixel value obtained by adding the emphasis level to a pixel value of a pixel which has a minimum brightness value in the pixel sequence when the second derivative at the position of the pixel of interest assumes a positive value, and to replace a pixel value of the pixel of interest by a pixel value obtained by adding the emphasis level to a pixel value of a pixel which has a maximum brightness value in the pixel sequence when the second derivative at the position of the pixel of interest assumes a negative value, wherein the replacement unit adjust the calculated second derivatives of brightness values in accordance with the print characteristic on the print medium set by the setting unit.

According to another aspect of the present invention, an image processing method for processing image data to be printed on a print medium by an image printing unit, comprising: a setting step of setting a print characteristic on the print medium in the image printing unit; a region setting step of setting a region configured by a plurality of pixels including a pixel of interest; a brightness value derivation step of deriving brightness values of the pixels in the region; a first derivative derivation step of deriving first derivatives of the brightness values derived in the brightness value derivation step for a plurality of pixel sequences in different directions, which include the pixel of interest; an edge direction determination step of determining an edge direction of brightness at a position of the pixel of interest based on the results of the first derivatives at positions of the pixel of interest in the respective pixel sequences derived in the first derivative derivation step; an emphasis level determination step of determining an emphasis level of a pixel value based on the print characteristic and the first derivatives at respective positions of a plurality of pixels which line up in the edge direction determined in the edge direction determination step; and a replacement step of calculating second derivatives of brightness values at respective positions of the plurality of pixels which line up in the edge direction determined in the edge direction determination step, replacing a pixel value of the pixel of interest by a pixel value obtained by adding the emphasis level to a pixel value of a pixel which has a minimum brightness value in the pixel sequence when the second derivative at the position of the pixel of interest assumes a positive value, and replacing a pixel value of the pixel of interest by a pixel value obtained by adding the emphasis level to a pixel value of a pixel which has a maximum brightness value in the pixel sequence when the second derivative at the position of the pixel of interest assumes a negative value, wherein the replacement step adjust the calculated second derivatives of brightness values in accordance with the print characteristic on the print medium set by the setting step.

According to still another aspect of the present invention, a program, stored in a computer-readable storage medium, for making a computer execute processing of image data to be printed on a print medium by an image printing unit, the program comprising: a program code for implementing a setting step of setting a print characteristic on the print medium in the image printing unit; a program code for implementing a region setting step of setting a region configured by a plurality of pixels including a pixel of interest; a program code for implementing a brightness value derivation step of deriving brightness values of the pixels in the region; a program code for implementing a first derivative derivation step of deriving first derivatives of the brightness values derived in the brightness value derivation step for a plurality of pixel sequences in different directions, which include the pixel of interest; a program code for implementing an edge direction determination step of determining an edge direction of brightness at a position of the pixel of interest based on the results of the first derivatives at positions of the pixel of interest in the respective pixel sequences derived in the first derivative derivation step; a program code for implementing an emphasis level determination step of determining an emphasis level of a pixel value based on the print characteristic and the first derivatives at respective positions of a plurality of pixels which line up in the edge direction determined in the edge direction determination step; and a program code for implementing a replacement step of calculating second derivatives of brightness values at respective positions of the plurality of pixels which line up in the edge direction determined in the edge direction determination step, replacing a pixel value of the pixel of interest by a pixel value obtained by adding the emphasis level to a pixel value of a pixel which has a minimum brightness value in the pixel sequence when the second derivative at the position of the pixel of interest assumes a positive value, and replacing a pixel value of the pixel of interest by a pixel value obtained by adding the emphasis level to a pixel value of a pixel which has a maximum brightness value in the pixel sequence when the second derivative at the position of the pixel of interest assumes a negative value, wherein the program code for implementing a replacement step adjust the calculated second derivatives of brightness values in accordance with the print characteristic on the print medium set by the program code for implementing a setting step.

According to yet another aspect of the present invention, an image processing apparatus for processing image data, comprising: a region setting unit adapted to set a region configured by a plurality of pixels including a pixel of interest; a determination unit adapted to determine a change characteristic of an image associated with the pixel of interest using the plurality of pixels in the set region; a print characteristic setting unit adapted to set a print characteristic on a print medium by a printing unit; and a modification unit adapted to modify the pixel of interest using the pixels in the region set by the region setting unit, and to correct a value of the modified pixel of interest based on the set print characteristic.

According to still yet another aspect of the present invention, an image processing method for processing image data, comprising: a region setting step of setting a region configured by a plurality of pixels including a pixel of interest; a determination step of determining a change characteristic of an image associated with the pixel of interest using the plurality of pixels in the set region; a print characteristic setting step of setting a print characteristic on a print medium by a printing unit; and a modification step of modifying the pixel of interest using the pixels in the region set by the region setting unit, and correcting a value of the modified pixel of interest based on the set print characteristic.

According to yet still another aspect of the present invention, a program, stored in a computer-readable storage medium, for making a computer execute processing of image data, the program comprising: a program code for implementing a region setting step of setting a region configured by a plurality of pixels including a pixel of interest; a program code for implementing a determination step of determining a change characteristic of an image associated with the pixel of interest using the plurality of pixels in the set region; a program code for implementing a print characteristic setting step of setting a print characteristic on a print medium by a printing unit; and a program code for implementing a modification step of modifying the pixel of interest using the pixels in the region set by the region setting unit, and correcting a value of the modified pixel of interest based on the set print characteristic.

According to the present invention, an edge emphasis technique that can eliminate image deterioration of a printed image of a digital image depending on the types of recording media.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 16 is a table showing adjustment amounts (Lap change amounts) for respective print medium types;

FIG. 17 is a table showing adjustment amounts (Lap change amounts) for respective character line widths;

FIG. 19 is a table for explaining a determination method of a replacement pixel position.

DETAILED DESCRIPTION OF THE PREFERRED EMBODIMENTS

Preferred exemplary embodiments of the present invention will be described in detail hereinafter with reference to the accompanying drawings. Note that building components described in these embodiments are merely examples, and they do not limit the scope of the invention.

(First Embodiment)

As the first embodiment of an image processing apparatus according to the present invention, an MFP (Multi Function Printer) will be exemplified below. In the following description, the apparatus arrangement and schematic operation of the MFP as a precondition will be explained first, and characteristic features of the present invention will then be explained in detail.

<Arrangement of MFP>

Figure 1:
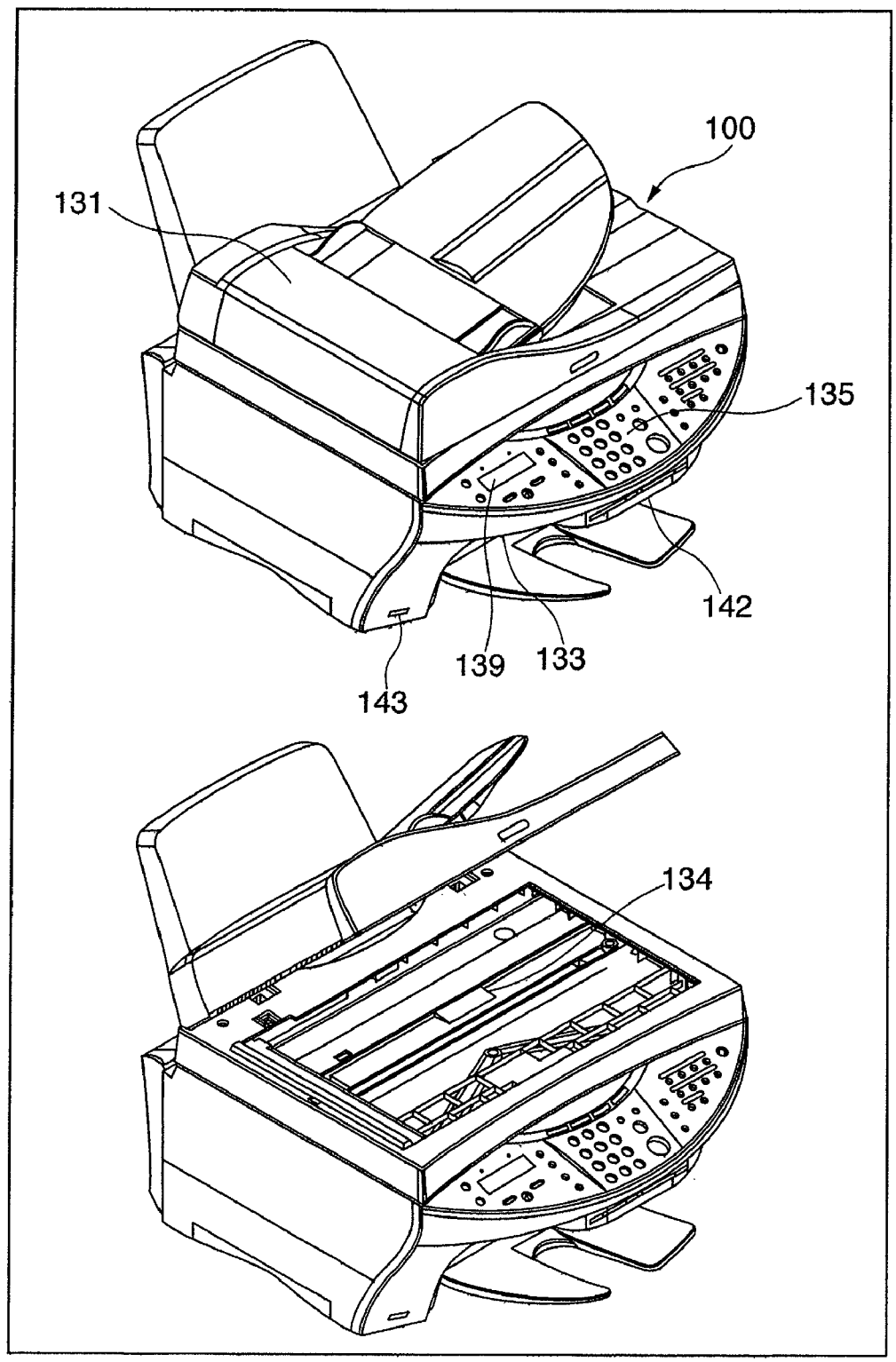
FIG. 1 shows schematic perspective views of a multi function printer (MFP) according to the first embodiment.

FIG. 1 shows schematic perspective views of a multi function printer (to be referred to as an MFP hereinafter) according to the first embodiment.

An MFP 100 comprises a function of printing data received from a host computer (PC) as a normal PC printer on a printing medium, and a function of scanning a document image as a scanner. Furthermore, functions of the MFP alone include a copy function of printing an image scanned by the scanner using the printer, a function of printing image data directly read from a storage medium such as a memory card or the like, or a function of printing image data received from a digital camera or the like.

To implement these functions, the MFP 100 comprises a scanning device 134 such as a flatbed scanner or the like, and a printing device 133 of an ink-jet system, electrophotography system, or the like. Also, the MFP 100 comprises a display panel 139 used to notify the user of various states, and an operation panel 135 including various key switches, and the like, which are used to accept various instructions from the user. The MFP 100 comprises a USB port (not shown) on its back surface used to communicate with the PC, and the USB port allows the MFP 100 to make various communications with the PC. In addition to the above arrangement, the MFP 100 comprises a card slot 142 used to read out data from various memory cards, and a camera port 143 used to make direct communication with a digital still camera (DSC). In addition, the MFP 100 comprises an auto document feeder (to be abbreviated as ADF hereinafter) 131 used to automatically set a document on a document table.

Figure 2:
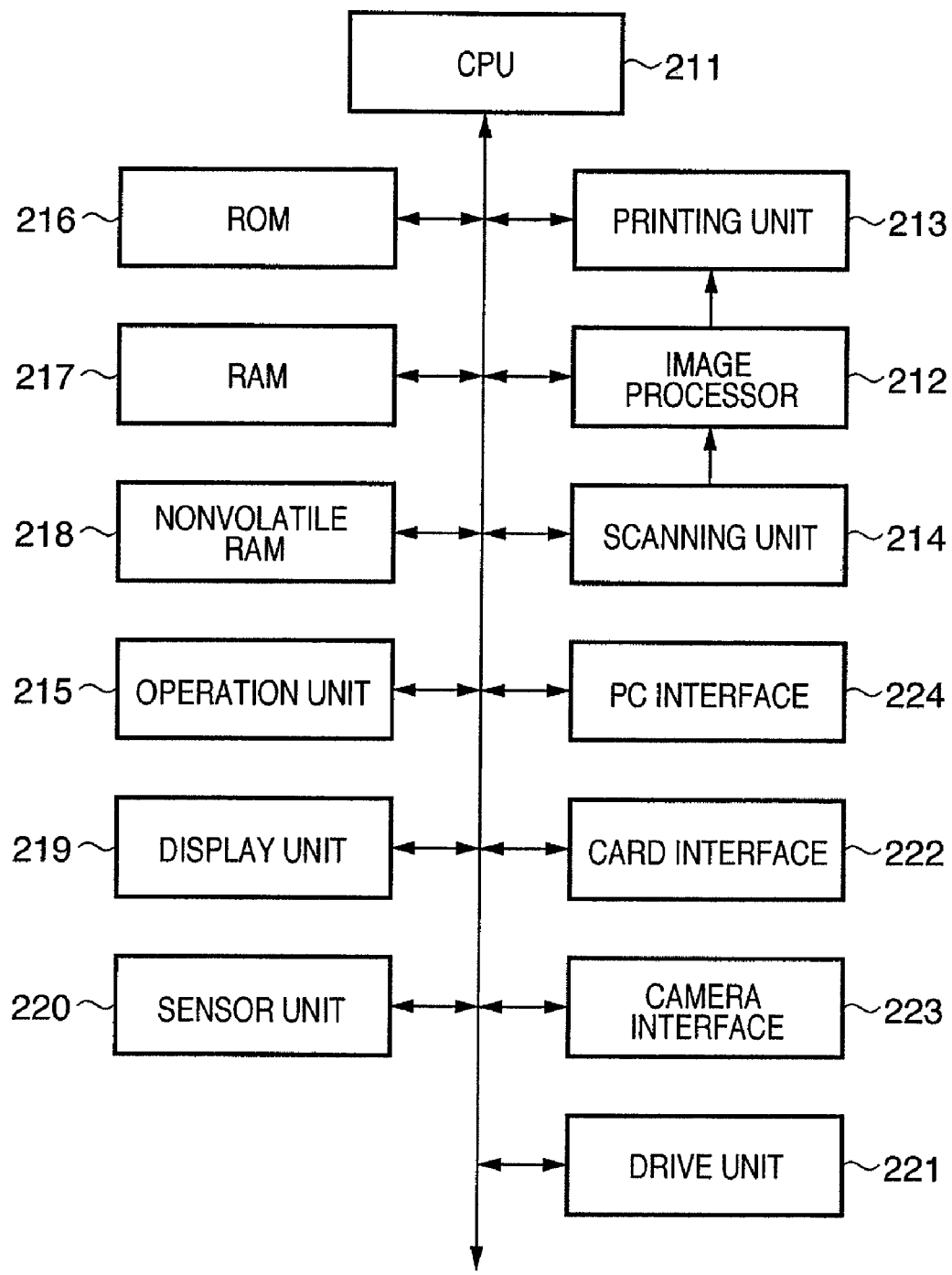
FIG. 2 is a block diagram showing the internal arrangement of the MFP.

FIG. 2 is a block diagram showing the internal arrangement of the MFP 100.

A CPU 211 controls various functions of the MFP 100 by executing various image processing programs stored in a ROM 216 in accordance with operations accepted from the user at an operation unit 215.

A scanning unit 214 corresponds to the scanning device 134, scans a document image using an optical sensor such as a CCD or the like, and outputs analog brightness data of, for example, red (R), green (G), and blue (B). The scanning unit 214 may comprise a contact image sensor (CIS) in place of the CCD. Using the aforementioned ADF 131, the scanning unit 214 can successively scan order sheets and the like.

A card interface 222 corresponds to the card slot 142, and reads image data, which is captured by, for example, a DSC and is stored in a memory card or the like, in accordance with an operation by the user at the operation unit 215. Note that the color space of image data read via the card interface 222 is converted from that (e.g., YCbCr) of the DSC into a standard RGB color space (e.g., NTSC-RGB or sRGB) if necessary. The read image data undergoes processes such as resolution conversion into the effective number of pixels and the like based on its header information as needed. A camera interface 223 corresponds to the camera port 143, and reads image data by directly connecting a DSC.

An image processor 212 is a functional unit for applying image processes to be described later to image data. For example, the image processor 212 executes image processes such as image analysis, calculations of conversion characteristics, conversion from brightness signals (RGB) into density signals (CMYK), scaling, gamma conversion, error diffusion, and the like. The image data that has undergone these image processes is stored in a RAM 217. When data stored in the RAM 217 reaches a predetermined data size required to be printed by a printing unit 213 corresponding to the printing device 133, the printing unit 213 executes a print operation.

A nonvolatile RAM 218 comprises, for example, a battery backed-up SRAM or the like, and stores data unique to the image processing apparatus or the like.

The operation unit 215 corresponds to the operation panel 135, and is a functional unit that accepts various operations from the user. For example, the operation unit 215 comprises keys specialized to attain specific processes such as a photo direct print start key which allows the user to select image data stored in a storage medium (memory card) and to start printing, a key used to print an order sheet, a key used to scan an order sheet, and the like. The operation unit 215 also comprises a copy start key in a monochrome copy mode or color copy mode, a mode key used to designate a mode such as a copy resolution, image quality, and the like, a stop key used to stop a copy operation or the like. Furthermore, the operation unit 215 comprises a numerical keypad used to input a copy count, a registration key, and the like. The CPU 211 detects the pressing states of these keys and controls respective units according to the detected states.

A display unit 219 corresponds to the display panel 139, comprises a dot matrix type liquid crystal display unit (LCD) and an LCD driver, and makes various displays under the control of the CPU 211. Also, the display unit 219 may display thumbnails of image data recorded on a storage medium.

The printing unit 213 corresponds to the printing device 133, and comprises an ink-jet head of an ink-jet system, general-purpose IC, and the like. The printing unit 213 reads out image data stored in the RAM 217 and prints it out as a hard copy under the control of the CPU 211.

A drive unit 221 includes stepping motors for driving feed and discharge rollers, gears for transmitting the driving forces of the stepping motors, a driver circuit for controlling the stepping motors, and the like in the operations of the scanning unit 214 and printing unit 213.

A sensor unit 220 includes a print sheet width sensor, print sheet sensor, document width sensor, document sensor, print medium sensor, and the like. The CPU 211 detects the states of a document and print sheet based on information obtained from this sensor unit 220.

A PC interface 224 is an interface between the PC and MFP 100. The MFP 100 can accept a print operation, scan operation, and the like from the PC via the PC interface 224.

In a copy operation by the MFP 100 alone, the image processor 212 processes image data, which is scanned by the scanning unit 214 based on the user's operation at the operation unit 215, and the printing unit 213 prints the processed image data.

<Overview of Image Processes>

Figure 3:
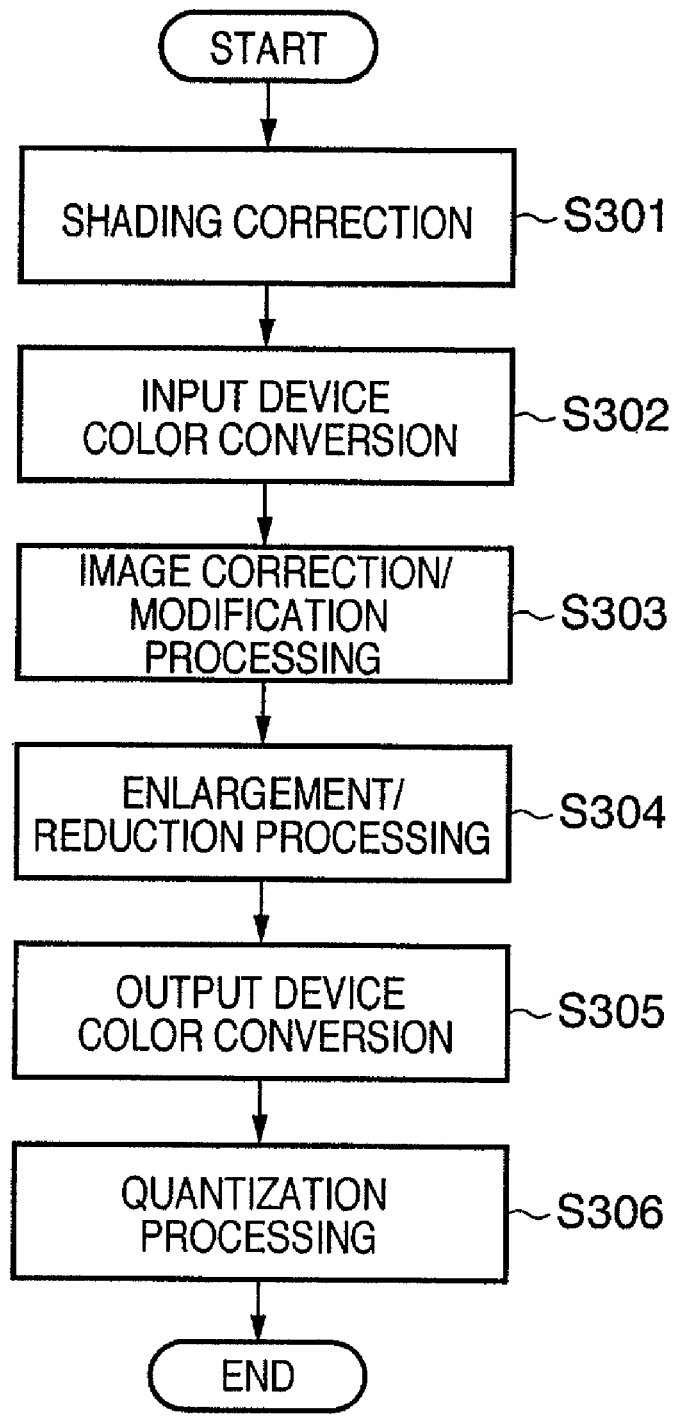
FIG. 3 is a flowchart of the overall processing to be executed by an image processor of the MFP.

FIG. 3 is a flowchart of the processes executed by the image processor of the MFP. Respective steps will be described below, but a detailed description of the processes will not be given. Note that the following steps are implemented when the CPU 211 executes various control programs.

In step S301, the CPU 211 executes shading correction. That is, the CPU 211 applies processing for correcting variations of an image sensing element to image data, which is scanned by the scanning unit 214 and is A/D-converted.

In step S302, the CPU 211 executes input device color conversion. This processing converts image data expressed by an input device-dependent color space into a standard color space. The standard color space includes sRGB standardized by IEC (International Electrotechnical Commission), AdobeRGB propounded by Adobe Systems, and the like. The conversion method includes an arithmetic method using a 3×3 or 3×9 matrix, a lookup table method which determines values based on a table that describes conversion rules, and the like.

In step S303, the CPU 211 executes image correction/modification processing. More specifically, the image correction/modification processing includes edge emphasis processing that corrects blurring as a result of scanning, text modification processing that improves legibility of text, processing for removing bleed-through that has occurred due to scanning upon light irradiation, and the like. Note that details of the edge emphasis processing will be described later.

In step S304, the CPU 211 executes enlargement/reduction processing. This processing converts image data to a desired scale when the user designates a zoom scale, a 2-in-1 copy mode that lays out two document images on one sheet, or the like. As the conversion method, methods such as bicubic, nearest neighbor, and the like are generally used.

In step S305, the CPU 211 executes output device color conversion. This processing converts image data expressed by the standard color space into that data expressed by an output device-dependent color space. For example, when the printing unit 213 of the MFP 100 of this embodiment adopts an ink-jet system that uses inks of cyan (C), magenta (M), yellow (Y), black (K), and the like, RGB data is converted into CMYK data. This conversion processing is the same as that in step S302.

In step S306, the CPU 211 executes quantization processing of image data. That is, the CPU 211 converts image data into tone levels that can be printed by the printing unit 213.

For example, in case of binary expression, that is, ON/OFF of ink dots in the ink-jet printing unit, image data may be binarized by a quantization method such as error diffusion or the like. As a result, the quantization processing can convert image data into a data format that the printing unit 213 can process, and the printing unit 213 executes a print operation based on this image data.

<Image Processing Unit>

Figure 4:
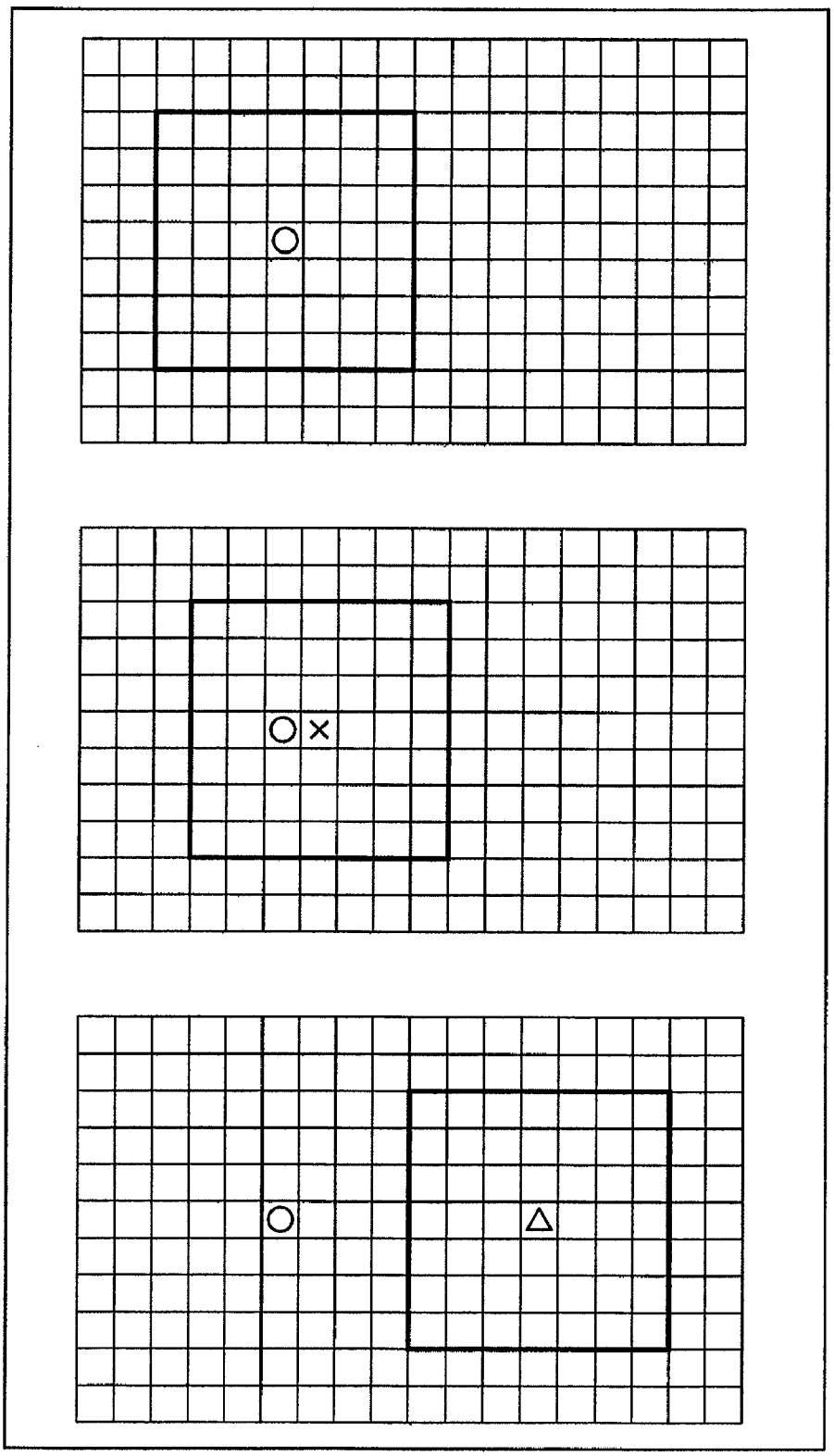
FIG. 4 is a view for explaining a processing unit of image processes upon execution of the image processes.

FIG. 4 is a view for explaining a processing unit of the image processes upon execution of the image processes.

A case will be explained below wherein the processing unit is a pixel unit. Assuming that a pixel indicated by "o" in an upper view of FIG. 4 is a pixel of interest (pixel to be processed), a region (7×7 region) defined by 7×7 pixels including the pixel of interest is set, as indicated by the bold line in the upper view of FIG. 4. A correction intensity for the pixel of interest is set using the image data in the 7×7 region set in this way, thus correcting the pixel of interest. After correction of the pixel of interest, a pixel that neighbors the pixel of interest is set as the next pixel of interest, as indicated by "x" in, for example, a middle view of FIG. 4, and a 7×7 region is set to have the pixel indicated by "x" as the pixel of interest, so as to similarly execute the correction processing. After that, the pixel of interest is similarly shifted pixel by pixel in turn and a new 7×7 region is set in each case, thus correcting all pixels to be corrected.

A case will be explained below wherein the processing unit is a region unit. A 7×7 region is set for a pixel indicated by "o" in the upper view of FIG. 4, and a correction intensity to be set for "o" is applied to a plurality of pixels, that is, all pixels, in the 7×7 region. As the next processing unit, a 7×7 region is set for a pixel indicated by "Δ" in a lower view of FIG. 4. In this way, the processing unit is shifted, so that the 7×7 region for "o" neighbors that for "Δ". However, the pixel unit is preferably used as the processing unit to set the correction intensity at higher accuracy. In the embodiments to be described hereinafter, the pixel unit will be described as the processing unit.

Figure 5:
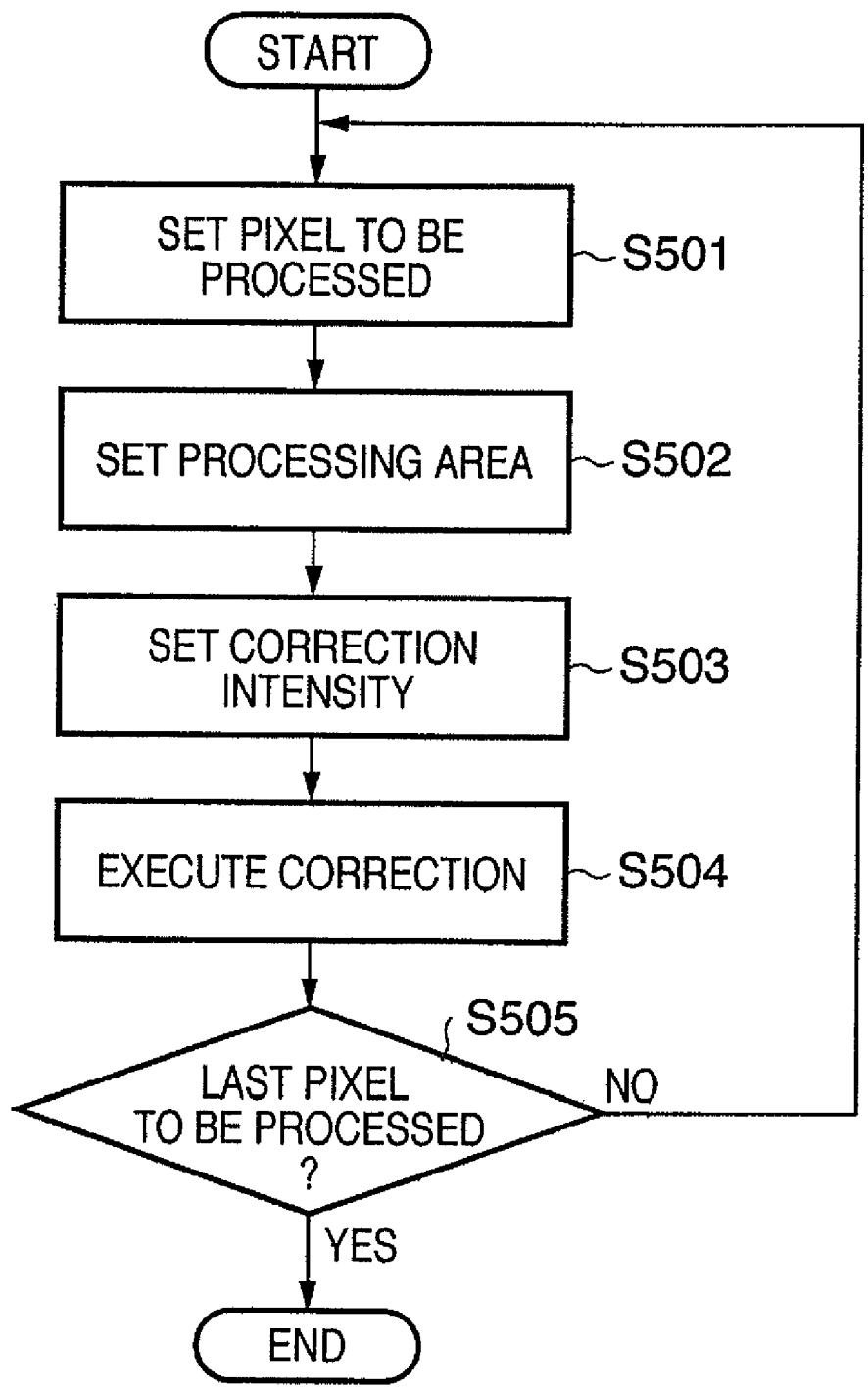
FIG. 5 is a flowchart for explaining the operation for shifting a processing unit.

FIG. 5 is a flowchart for explaining the operation for shifting the processing unit.

Step S501 is setting processing of a processing target (pixel to be processed). After the start of the processing, the CPU 211 sets a first pixel to be processed. If the process returns from step S505 to step S501, the CPU 211 sets the next pixel to be processed.

In step S502, the CPU 211 sets a processing region. The processing region is a region configured by a plurality of pixels (7×7 region) including the processing unit, as described above.

In step S503, the CPU 211 sets a correction intensity. That is, the CPU 211 sets a correction intensity for the processing unit.

In step S504, the CPU 211 corrects the processing unit using the correction intensity set in step S503.

The CPU 211 determines the last correction target in step S505, that is, checks if the processed processing unit is the last one. If the processing unit is not the last one (NO), the process returns to step S501. If the processing unit is the last one (YES), this processing ends.

In replacement processing of this embodiment, the 7×7 region will be described as the processing region. This is because the pixel range of a document to be scanned by one pixel of the image sensing element (CCD or CIS) used in the scanning device 134 described using FIG. 1 and the scanning unit 214 described using FIG. 2 is designed to include six pixels or less. Although the pixel range to be scanned is designed to include six pixels or less, reflected light from a document that enters the image sensing element receives various influences due to float of a document from the document table, unevenness of a document, and the like. For this reason, one pixel of the image sensing element may scan a range exceeding six pixels. The embodiments to be described hereinafter show a plurality of graphs used to explain image signals obtained by scanning a document. However, these image signals are not always obtained from reflected light within six pixels or less.

Figure 6A:
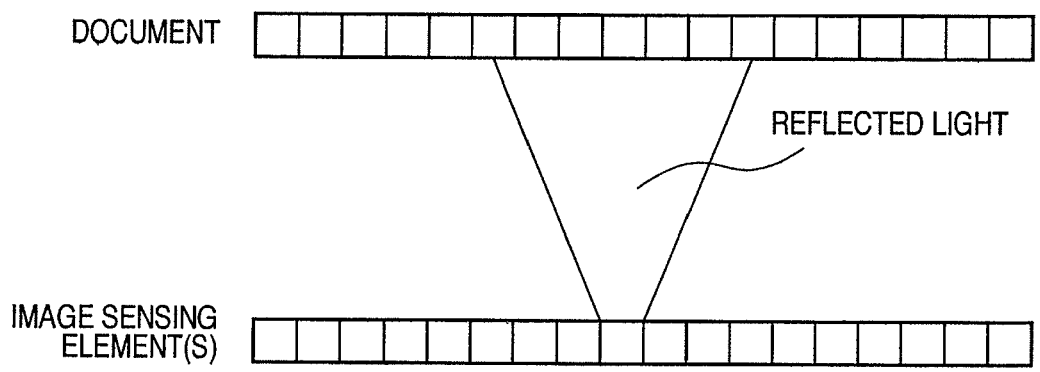
FIGS. 6A and 6B are views illustrating a range of reflected light which comes from a document and enters one pixel of an image sensing element.
Figure 6B:
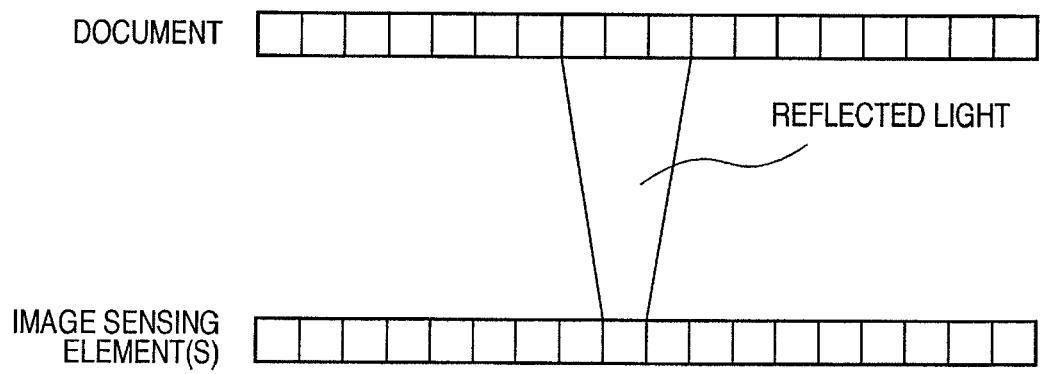

FIGS. 6A and 6B illustrate the range of reflected light that comes from a document and enters one pixel of the image sensing element. As shown in FIG. 6A, the image sensing element used in this embodiment is designed so that reflected light within six pixels from a 7-pixel range of a document enters one pixel of the image sensing element (as described above, reflected light that exceeds six pixels may enter in some cases). That is, reflected light from one pixel on a document influences seven pixels of the image sensing element. This causes edge blurring described in the paragraphs of the related art, and deteriorates sharpness.

Therefore, upon execution of the edge emphasis processing based on pixel value replacement, by selecting a replacement candidate from a pixel region less influenced by a document pixel corresponding to the pixel of interest, the edge emphasis effect can be enhanced. For this reason, in order to ensure a minimal region which is influenced by one pixel of a document image as the processing region, the 7×7 region is set as the processing region. However, in order to enhance the edge emphasis effect more, it is effective to set a region exceeding 7×7 pixels as a reference region. Also, when one pixel of the image sensing element is designed to receive reflected light from a 3-pixel range of a document, as shown in FIG. 6B, the processing region may be set as small as a 3×3 region. In this manner, the reference region can be set as needed in accordance with the performance of the image sensing element such as the number of pixels of the image sensing element influenced by one pixel of a document image, the spot size, the number of blurred pixels, Modulation Transfer Function (MTF), and the like.

Definitions and limitations of terms used in the description of the embodiments of the present invention will be described below.

In the embodiment to be described below, a fluctuation count will be described as the number of sign changes (the number of zero-crossing points) in brightness changes in a region of interest. However, the present invention is not limited to such specific definition. That is, the fluctuation count is defined as a value that expresses the frequency of occurrence of changes in value associated with image signals such as the number of zero-crossing points or spatial frequency of the first derivatives of values associated with image signals in the region of interest, the number of black-white changes after binarization, and the like.

In the embodiment to be described below, a fluctuation amount will be described as the absolute value (edge amount) of the brightness difference with respect to a pixel of interest. However, the present invention is not limited to such specific definition. That is, the fluctuation amount is defined as a value that expresses the difference (magnitude) of changes such as the absolute value of the first derivative of a value related to an image signal of a pixel of interest or the like, or as a value that representatively expresses the difference (magnitude) of changes of values related to image signals in a region of interest.

In the embodiment to be described below, a fluctuation acceleration will be described as a value obtained by further calculating a difference from the differences of brightness values in the region of interest. However, the present invention is not limited to such specific definition. That is, the fluctuation acceleration is defined as a value that expresses the acceleration of changes such as the second derivative of values associated with image signals in the region of interest and the like.

In the embodiment to be described below, a saturation will be explained as a maximum absolute value of image signal differences of respective colors of a pixel or region of interest. However, the present invention is not limited to such specific definition. The saturation is defined as a value that expresses the distance from the brightness axis.

As will be described in the embodiment to be described below, adaptive setting of a correction intensity is defined such that different correction intensities are set for each value in at least some value regions of those which the defined fluctuation count, fluctuation amount, fluctuation acceleration, and saturation can assume.

Details of the embodiment will be described below. Note that in the embodiment, an image signal is expressed by RGB components, and each component is expressed as an 8-bit integer value (0 to 255 in decimal). However, the range of the image signal is not limited to such a specific range, and may be set to fit the image processes. Note that white is expressed as R=G=B=255, and black is expressed as R=G=B=0.

<Output Device Characteristics>

The following description will be given taking ink bleeding caused by combinations of print medium types and inks as an example of the output device characteristics.

Figure 7:
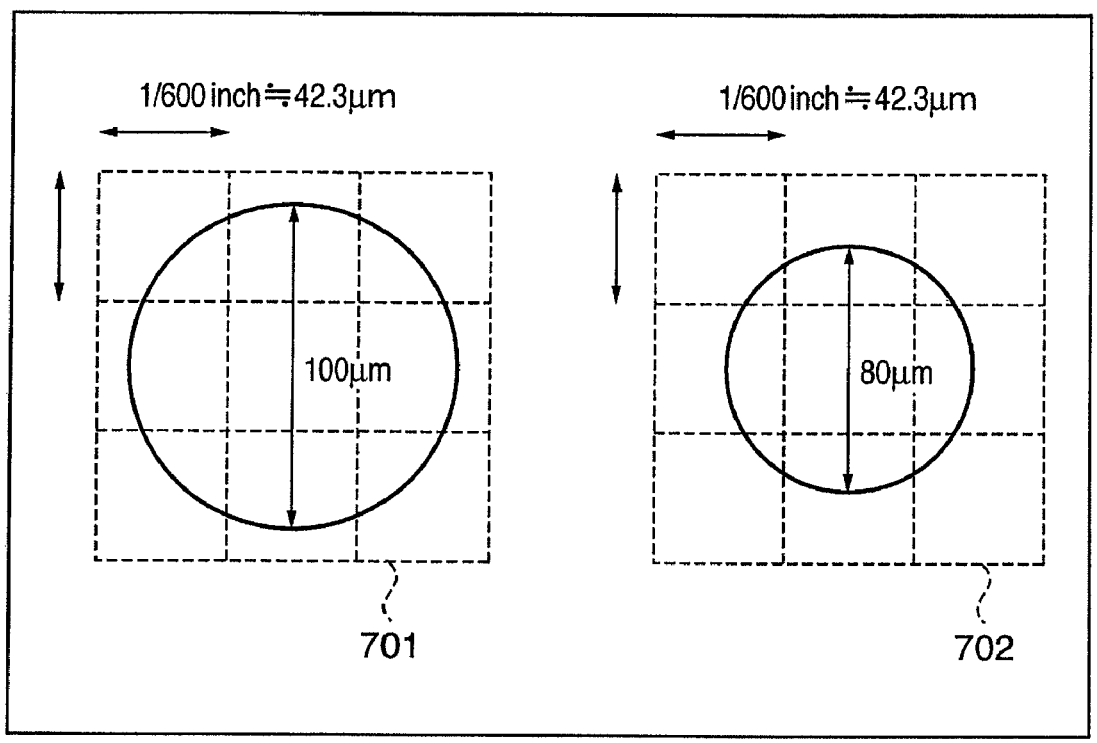
FIG. 7 illustrates a state in which an ink drop lands on a print medium and is printed.
Figure 8:
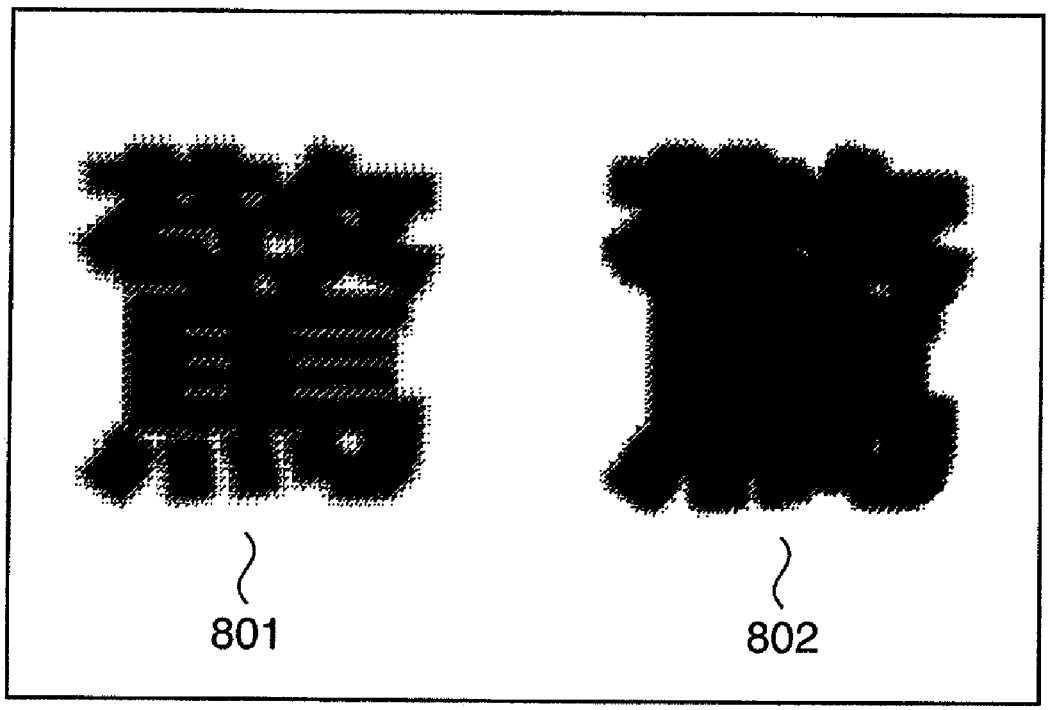
FIG. 8 illustrates a state in which edge emphasis processing is applied to image data including a bold character (prior art)

FIG. 7 illustrates a state in which an ink drop lands on a print medium and is printed. A frame indicated by the broken line indicates a spacing corresponding to a pixel as a minimum unit of image processing. For example, upon execution of processing at 600 pixels per inch (600 DPI), one side of one grid is 42.3 μm. On the other hand, a circle indicates one ejected ink dot corresponding to one printed pixel.

Reference numeral 701 denotes a printed state upon ejecting ink onto a copy paper sheet generally called plain paper. In an ink-jet printer used in this embodiment, the diameter of one dot is 100 μm. On the other hand, reference numeral 702 denotes a printed state upon ejecting ink onto a print medium called photo print paper designed for the purpose of photo printing. Since an ink absorption layer is coated on the surface of the photo dedicated paper, this paper suffers less ink bleeding, and has higher coloring characteristics than plain paper. For this reason, the diameter of one dot is 80 μm smaller than that of plain paper.

Upon execution of processing for emphasizing an image edge part, the processing result may be different from that the user intended if the state of ink landing on a print medium is not considered. Particularly in a character image, since the contour line of a character gets thick, this causes character collapse, resulting in an illegible character.

Factors that contribute to the dot size when ink lands on a print medium include print medium types, ink compositions, and environmental factors such as temperature, humidity, and the like. This embodiment executes image processing using a correction table that corrects the dot size caused depending on the print medium types of these fluctuation factors.

<Details of Correction Operation>

Figure 9:
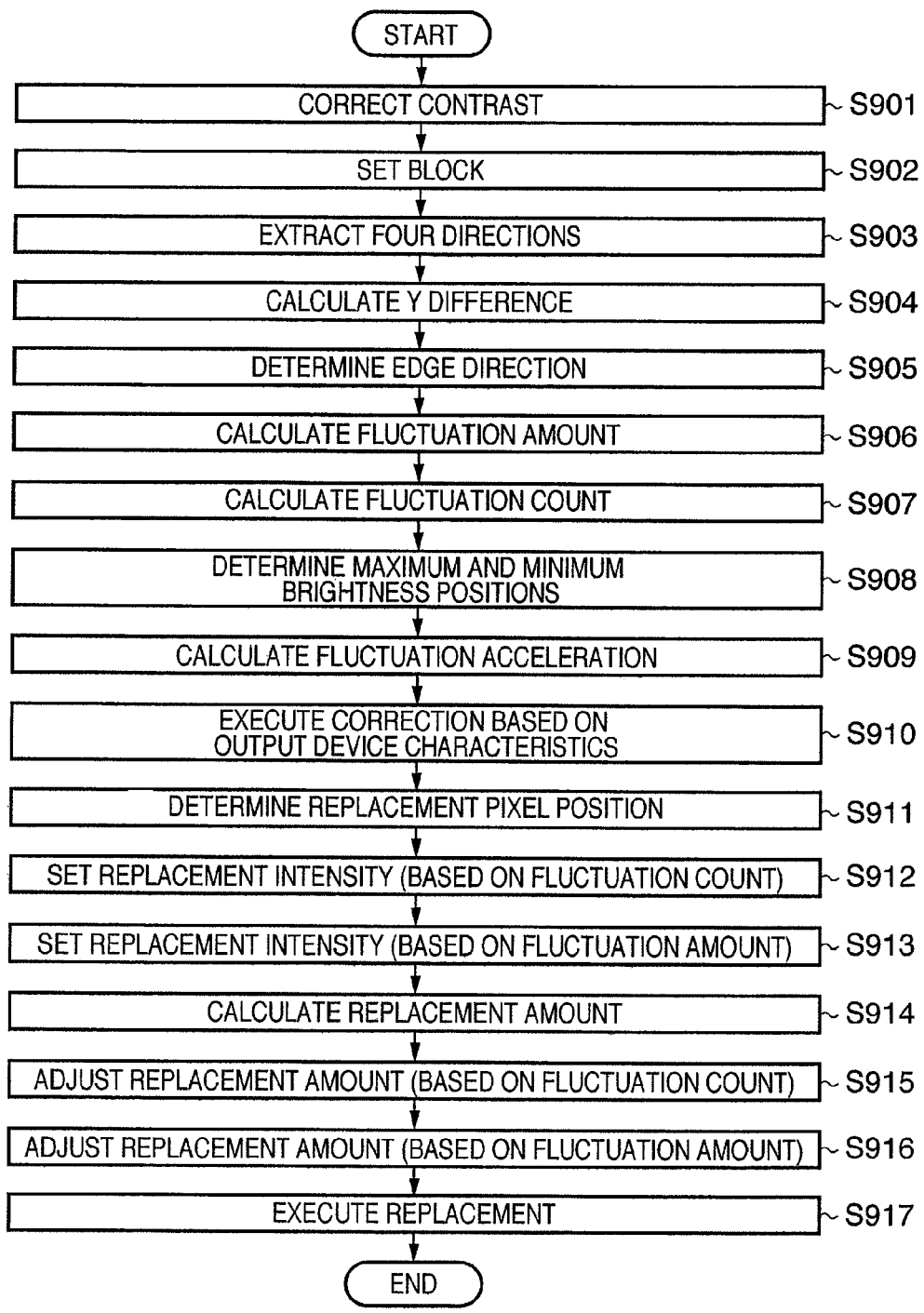
FIG. 9 is a detailed flowchart of an edge processing operation according to the first embodiment.

FIG. 9 is a detailed flowchart of the edge processing operation according to the first embodiment. Note that the type of recording media used to print out an image is set in advance in the image processor of the MFP 100 prior to the beginning of this flowchart. The type setting may be designated by the user or may be automatically made in accordance with the location of a paper tray or the like where print media are set. Also, a print medium may be directly detected using an optical sensor or the like.

Figure 12:
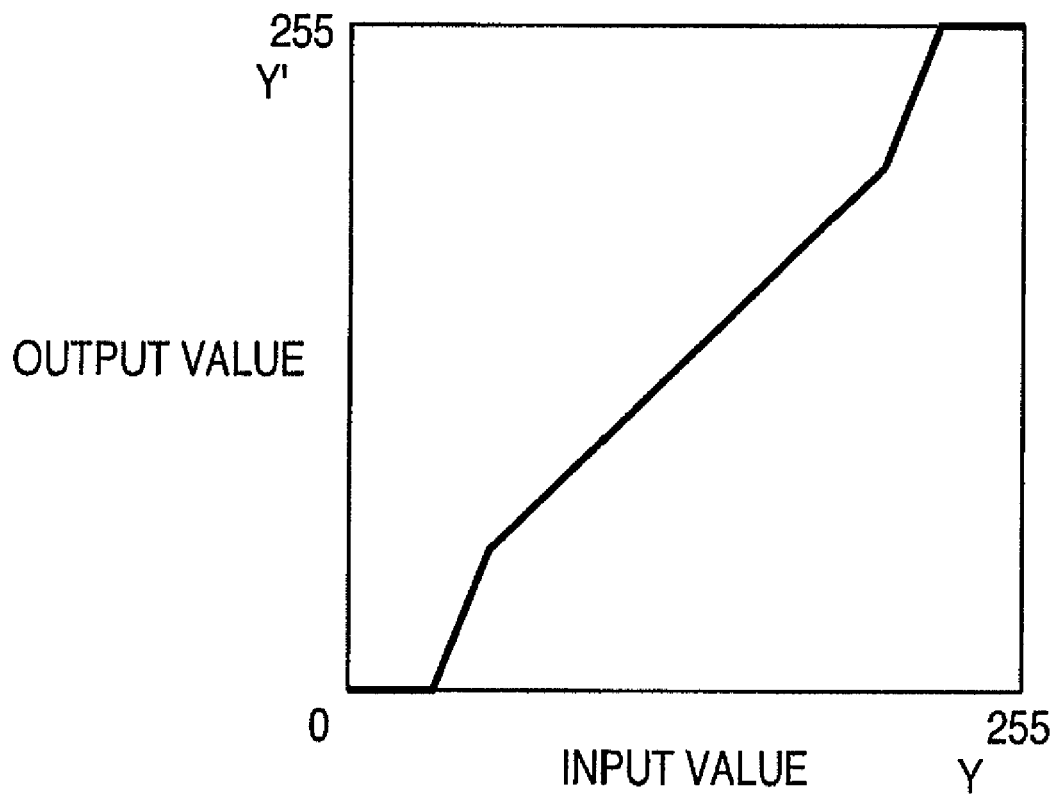
FIG. 12 is a graph showing the input/output characteristics of contract correction.

In step S901, the CPU 211 applies contrast correction to an image configured by RGB multi-valued image signals. FIG. 12 shows the input/output characteristics of contrast correction. In this step, the CPU 211 corrects contrast by converting the scanned brightness values (RGB signal values) using a one-dimensional lookup table. In particular, the one-dimensional lookup table with characteristics that convert a part (background part) close to white, which seems as a sheet surface of a document, into white, and a part (black part) close to black, which seems as a character, into black, is used.

Note that the one-dimensional lookup table need not always be a table for all input brightness values. For example, only a table for brightness values of the background part and black part may be prepared, and other brightness values may be processed as an input value=output value without looking up the table. Also, the implementation method of contrast correction is not limited to specific processing using the one-dimensional lookup table. For example, contrast may be corrected by arithmetic processing using input/output functions.

In step S902, the CPU 211 sets a processing region, that is, a 7×7 region including seven pixels in the horizontal direction and seven pixels in the vertical direction to have the pixel of interest as the center in the image that has undergone the contrast correction. Furthermore, the CPU 211 generates a 7×7 processing region of brightness Y by calculating brightness Y from respective pixel values of the processing region by:

$$Y = 0.29891 \times R + 0.58661 \times G + 0.11448 \times B \tag{11}$$

This embodiment uses brightness Y calculated using equation (11). However, other values may be used as long as they express a lightness component of an input pixel. For example, an L* value in the L*a*b* color space expression or an L value in the LUV color space expression may be used. In place of use of these color spaces intact, a color space that approximately expresses these color spaces may be used for the sake of simple calculation.

Note that the processing region size is defined by 7×7 pixels in this embodiment. However, as has been explained in the description of the image processing unit, the processing region size may be expressed by other numbers of pixels as needed.

Figure 13A:
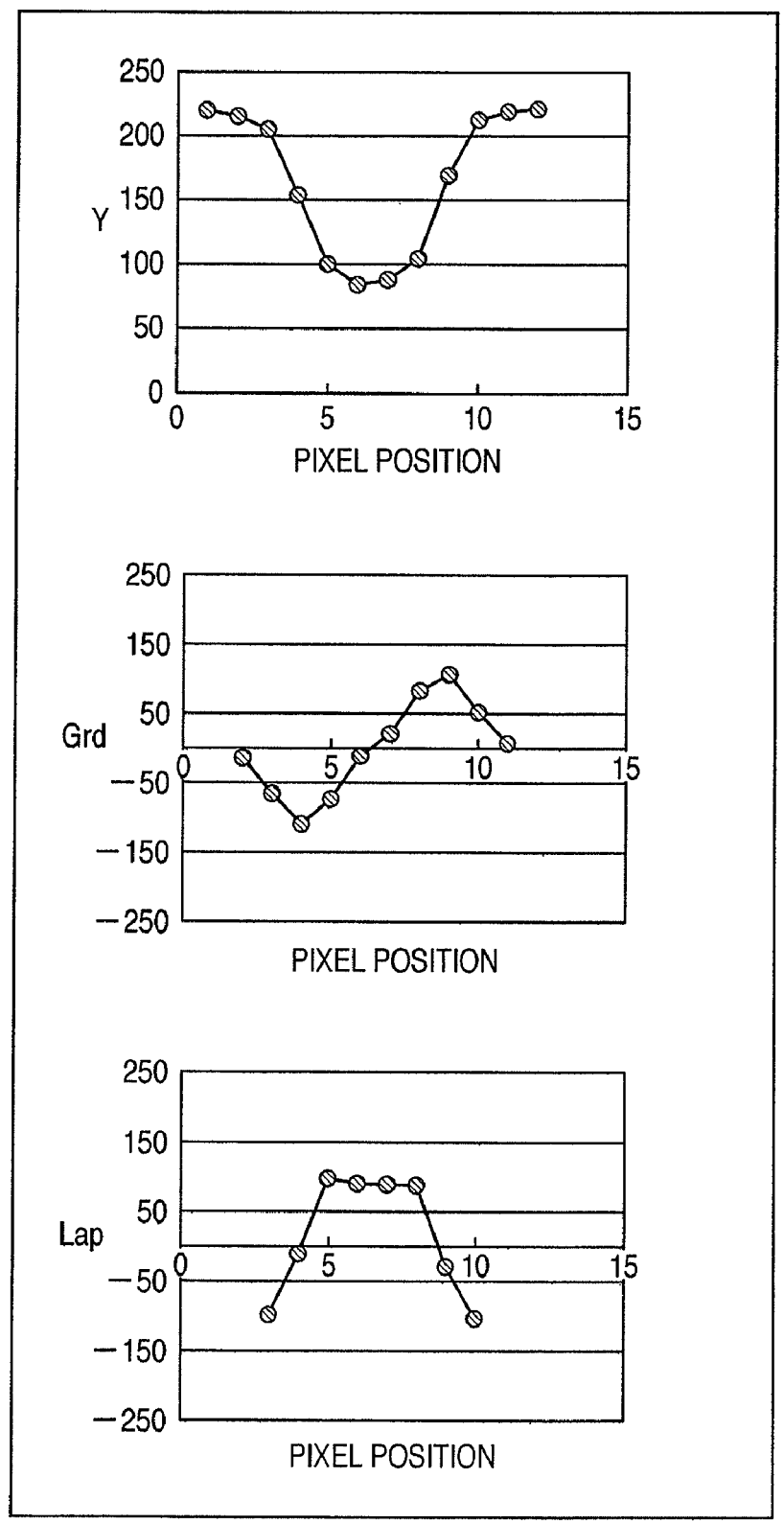
FIGS. 13A and 13B are graphs illustrating changes in brightness value, first derivative, and second derivative for two different patterns.
Figure 13B:
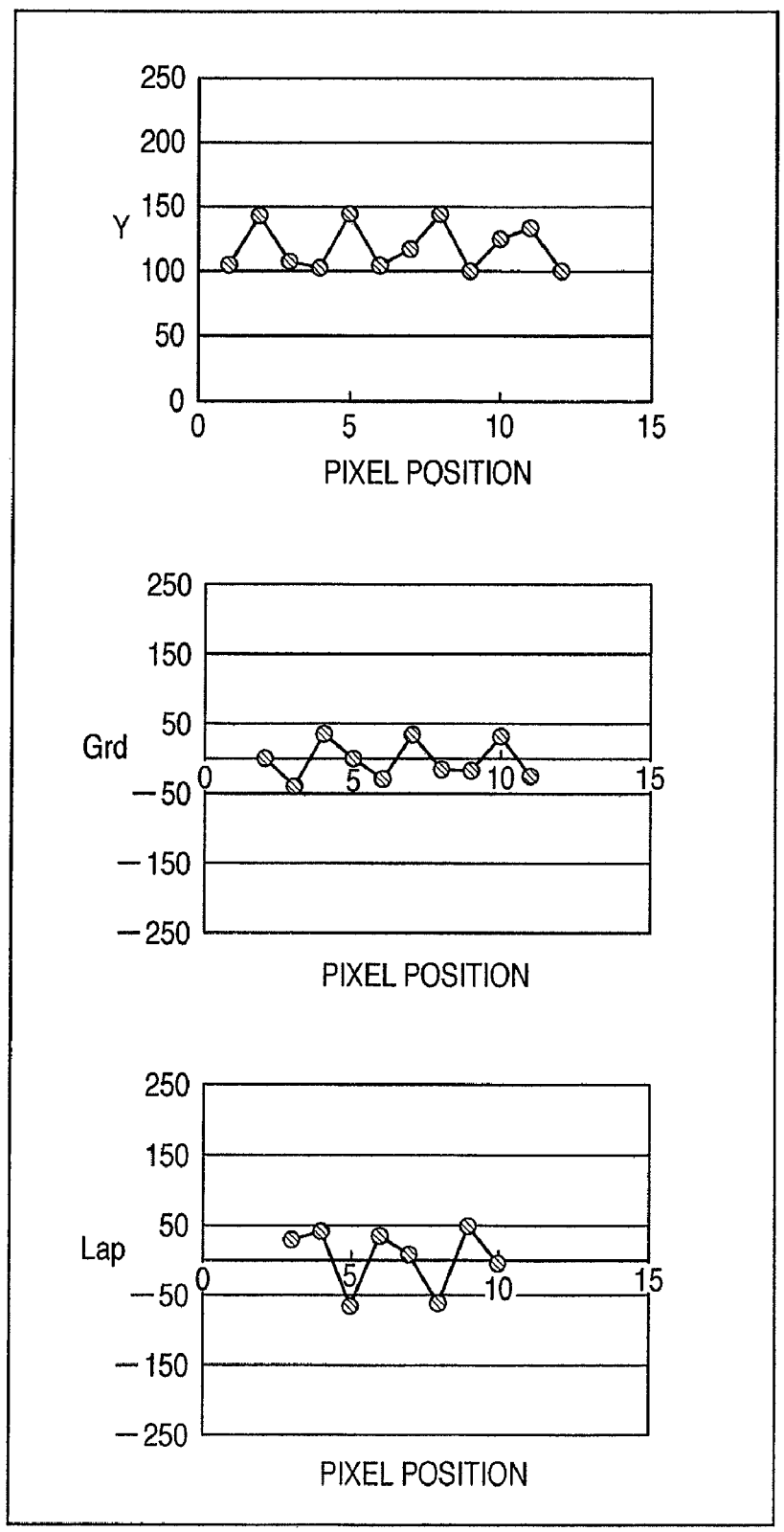

FIGS. 13A and 13B illustrate changes in brightness value (Y), first derivative equivalent amount (Grd), and second derivative equivalent amount (Lap) corresponding to pixel positions for two types of patterns having different features. The upper graphs of FIGS. 13A and 13B show changes in brightness values. FIG. 13A shows a change in brightness value corresponding to pixel positions upon scanning a black vertical line in a white background in the horizontal direction. On the other hand, FIG. 13B shows a change in brightness value corresponding to pixel positions upon scanning halftone dots, that line up in the horizontal direction in a white background, in the horizontal direction.

Figure 11:
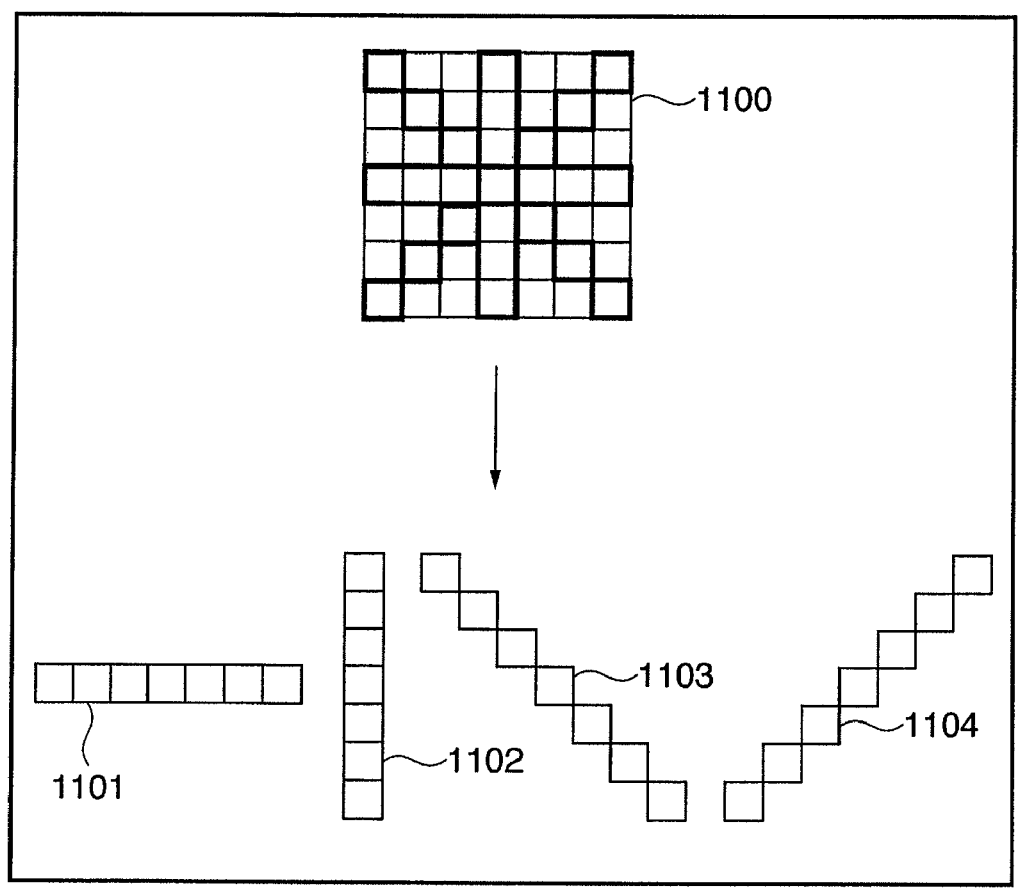
FIG. 11 is a view for explaining pixel value extraction from pixel sequences in four directions.

In step S903, the CPU 211 extracts, from the processing region of Y generated in step S902, pixel values from pixel sequences in at least two directions. For example, the CPU 211 extracts pixel values of seven pixels in each of a total of four directions, that is, one horizontal direction 1101, one vertical direction 1102, and two oblique directions 1103 and 1104, as shown in FIG. 11.

Figure 14:
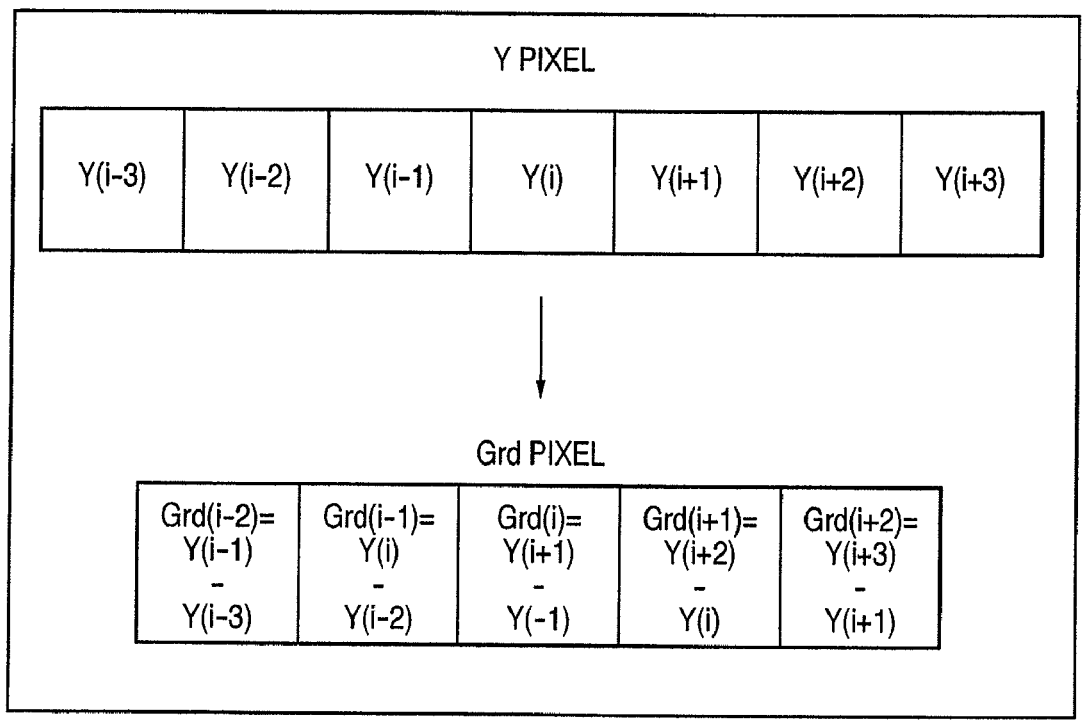
FIG. 14 is a view for explaining derivation of a first derivative (Grd)

In step S904, the CPU 211 calculates differences Grd corresponding to first derivatives of Y of five pixels in each direction from Y in the four directions extracted in step S903, as shown in FIG. 14, and using:

$$Grd(i) = Y(i+1) - Y(i-1) \tag{12}$$

where Y(i−1) is a pixel before pixel Y(i), and Y(i+1) is a pixel after pixel Y(i).

Note that the difference between two pixels before and after the pixel of interest is calculated so that the derived Grd value corresponds to each pixel position. However, other methods may be used. For example, differences between neighboring pixels may be calculated, or differences between pixels further separated from those before and after a given pixel described above may be calculated. In this case, interpolation processing or the like may be used together, so that the pixel position matches that where the Grd value is derived.

Middle graphs of FIGS. 13A and 13B show changes in Grd value calculated by applying equation (12) to the brightness values X in the upper graphs.

In step S905, the CPU 211 calculates Grd absolute values in the four directions at the position of the pixel of interest in Grd in the four directions calculated in step S904 and determines an edge direction. More specifically, the CPU 211 determines a direction that shows a maximum Grd absolute value of those in the four directions as an edge direction of the pixel of interest. Note that a direction may be obtained from the Grd values in the two directions by using an arctangent function.

In step S906, the CPU 211 derives, as an edge amount, a maximum absolute value from five pixels of Grd of the edge direction calculated in step S904 in the edge direction determined in step S905. That is, an edge is stronger with increasing edge amount, and is close to flat with decreasing edge amount.

In step S907, the CPU 211 calculates a fluctuation count as a total of the four directions from the Grd values in the four directions calculated in step S904. Note that the fluctuation count corresponds to the frequency.

Figure 15:
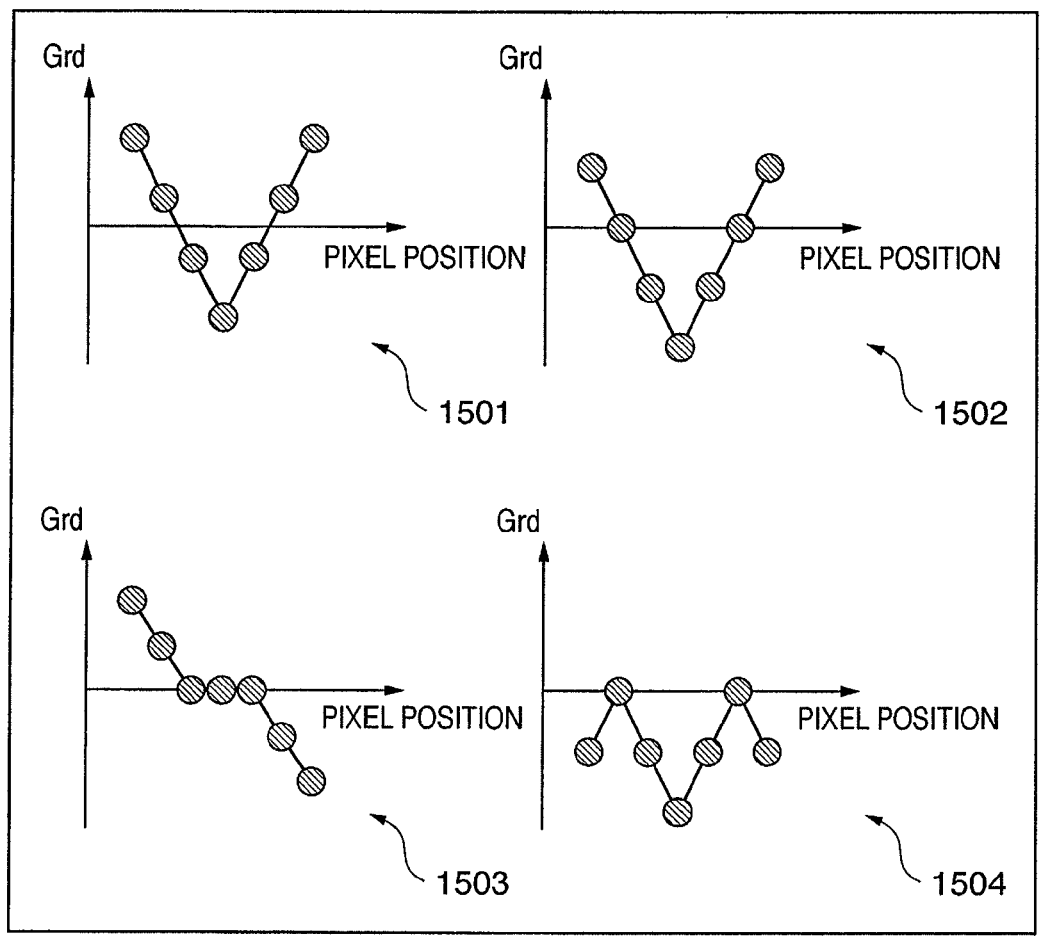
FIG. 15 shows graphs for explaining a fluctuation count.

FIG. 15 shows graphs for explaining a fluctuation count. The fluctuation count is the number of times the sign of Grd changes from + to − or vice versa, as shown in a graph 1501. Alternatively, the fluctuation count (the number of zero-crossing points) of the pixel of interest is obtained by calculating the number of times the sign of Grd changes from + to 0 and then to − at the next pixel, or from − to 0 and then to + at the next pixel, as shown in a graph 1502. That is, the number of times of changes shown in each of the graphs 1501 and 1502 is counted as twice. In this embodiment, a case will be described wherein the frequency is derived by counting the number of times the sign changes from + to − or vice versa. Of course, the CPU 211 may directly derive frequency components using an FFT operation or the like.

Note that this embodiment does not count, as the fluctuation count, a case in which the sign changes to sandwich zeros of a plurality of pixels, as shown in a graph 1503, or a case in which the Grd value becomes zero but its sign does not change, as shown in a graph 1504.

In step S908, the CPU 211 extracts a pixel sequence in the edge direction determined in step S905 from those in the four directions extracted in step S903. The CPU 211 determines pixel positions with maximum Y and minimum Y based on the extracted pixel sequence of the seven pixels.

In step S909, the CPU 211 calculates a fluctuation acceleration Lap as the second derivative of three pixels from Grd of the edge direction calculated in step S904 in the edge direction determined in step S905. The calculation method of the fluctuation acceleration is described by:

$$Lap(i) = Grd(i+1) - Grd(i-1) \tag{13}$$

where Grd(i−1) is a pixel before pixel Grd(i), and Grd(i+1) is a pixel after that pixel. Note that the calculation method of the fluctuation acceleration is not limited to such a specific equation, and the difference between neighbor Grd values may be calculated. Of course, a general Laplacian mask or DOG filter may be used.

Lower graphs of FIGS. 13A and 13B respectively show changes in Lap values corresponding to the pixel position, which are calculated by applying equation (13) to Grd shown in the upper graphs.
Checked to Here In step S910, the CPU 211 adjusts the Lap(i) value calculated in step S909 based on the output device characteristics. This embodiment will explain an example in which the print medium type is designated as the output device characteristics. That is, this embodiment supports adjustment of ink bleed depending on the print medium type. The CPU 211 derives an adjusted fluctuation acceleration Lap'(i) by:

$$Lap'(i) = Lap(i) + DEVICE(\text{print medium type}) \quad (14)$$

where DEVICE(print medium type) is a function of the adjustment amount depending on the print medium type.

That is, the CPU 211 derives Lap'(i) by adding an adjustment amount, which is determined in advance for each print medium type, to Lap(i) calculated in step S909.

FIG. 16 is a table showing adjustment amounts (Lap change amounts) corresponding to respective print medium types. That is, FIG. 16 shows the adjustment amounts corresponding to dot sizes determined depending on the types of print media and inks set in the printer. The print medium type is set in advance in the image processor of the MFP 100, as described above.

When this adjustment amount assumes a larger value, the pixel value is corrected to the smaller brightness value side in step S915 to be described later. That is, the edge part is more likely to whiten. As a result, too strong edge emphasis of a character can be avoided.

This embodiment has explained the example in which only the print medium type is designated as the output device characteristics. Of course, correction based on the ink type may be executed. Upon execution of correction for a plurality of fluctuation factors such as the types of print media and inks, a correction table of their combinations is prepared in advance to execute processing, thus obtaining better correction results. In this embodiment, a single correction table corresponding to brightness Y is used. However, a plurality of correction tables corresponding to respective ink colors may be prepared, and corrections may be independently executed using these tables.

In step S911, the CPU 211 determines a replacement pixel position based on the pixel positions with maximum Y and minimum Y determined in step S908 and the adjusted fluctuation acceleration Lap'(i) calculated in step S910.

FIG. 19 is a table for explaining the determination method of the replacement pixel position. In FIG. 13A or 13B, when the sign of Lap is +, Y of the pixel of interest tends to assume a value, the magnitude of which is closer to minimum Y than maximum Y; when the sign of Lap is −, Y of the pixel of interest tends to assume a value, the magnitude of which is closer to maximum Y than minimum Y. Hence, in this embodiment, the replacement pixel position is determined, as shown in FIG. 19. Note that handling of the edge center where Lap of the pixel of interest becomes zero is not limited to FIG. 19. When Lap of the pixel of interest is zero, the pixel position with maximum Y or minimum Y may be determined as the replacement pixel position.

Figure 10:
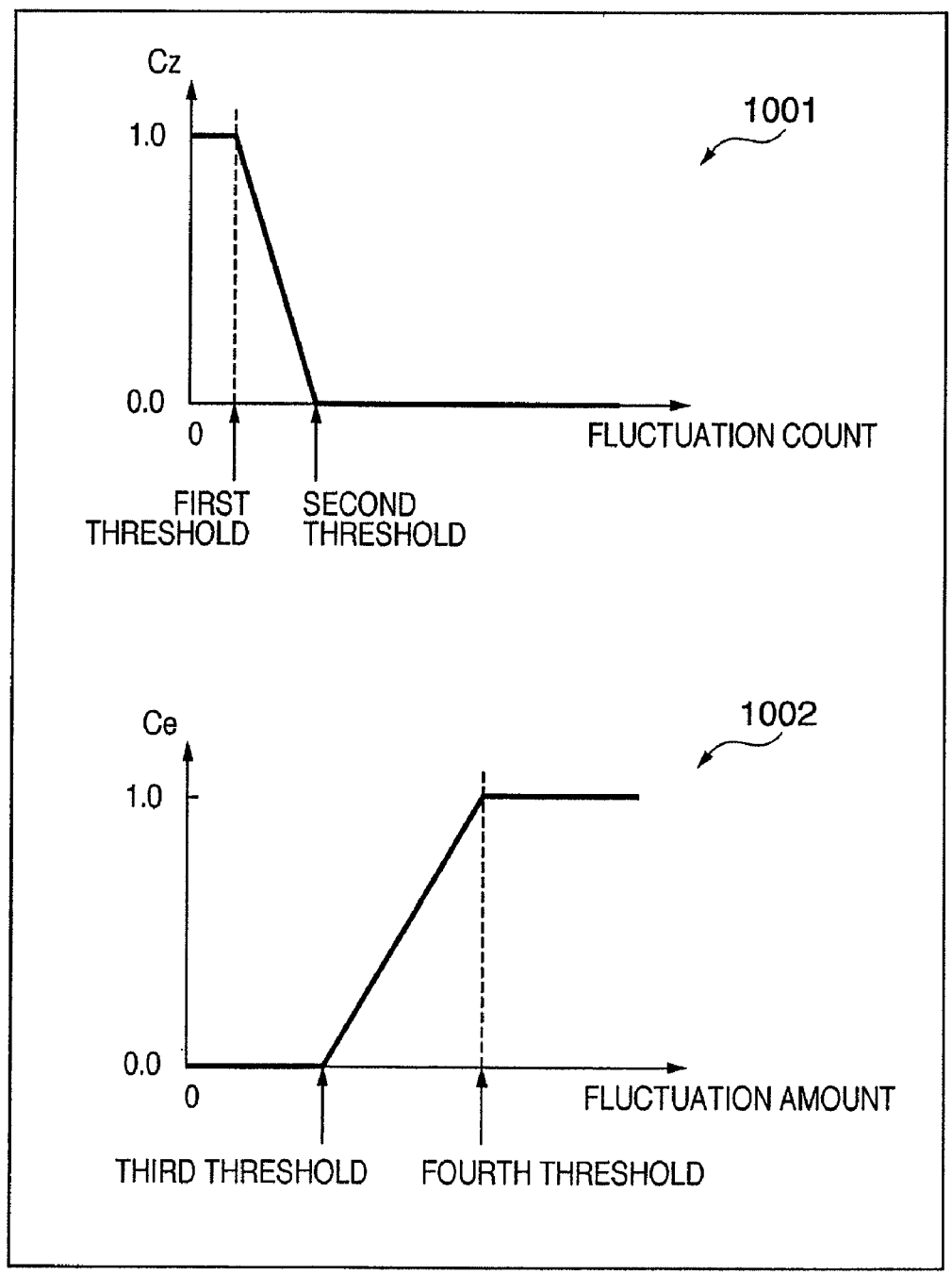
FIG. 10 shows graphs for explaining edge intensity settings.

In step S912, the CPU 211 adaptively sets an edge intensity Cz based on the fluctuation count calculated in step S907. A graph 1001 in FIG. 10 is used to explain the Cz setting in step S912: the abscissa plots the fluctuation count, and the ordinate plots Cz. In case of the fluctuation count which is smaller than a first threshold and with which a text region is more likely to be determined, Cz is set to be 1 to emphasize the edge. In case of the fluctuation count which is larger than a second threshold and with which a halftone region that readily causes moiré at high LPI is more likely to be determined, Cz is set to be 0 so as not to emphasize moiré. In case of the fluctuation count falling within a range between the first and second thresholds (both inclusive), different Cz is adaptively set for each fluctuation count to obscure switching of the processes. More specifically, the CPU 211 can adaptively set Cz using equation (15) below corresponding to the graph 1001:

$$Cz = (\text{second threshold} - \text{fluctuation count})/(\text{second threshold} - \text{first threshold}) \quad (15)$$

Note that when the fluctuation count=first threshold, Cz=1; when the fluctuation count=second threshold, Cz=0.

In step S913, the CPU 211 adaptively sets an edge intensity Ce in accordance with the edge amount calculated in step S906. A graph 1002 in FIG. 10 is used to explain the Ce setting in step S913: the abscissa plots the edge amount, and the ordinate plots Ce. In case of the fluctuation amount which is smaller than a third threshold and with which a flat region is more likely to be determined, Ce=0 is set so as not to roughen an image by emphasizing small fluctuation amounts. In case of the fluctuation amount which is larger than a fourth threshold and with which an edge region is more likely to be determined, Ce=1 is set to apply edge emphasis. In case of the fluctuation amount falling within a range between the third and fourth thresholds (both inclusive), different Ce is adaptively set for each edge amount, so as to obscure switching of the processes. More specifically, the CPU 211 can adaptively set Ce using equation (16) below corresponding to the graph 1002:

$$Ce = (\text{edge amount} - \text{third threshold})/(\text{fourth threshold} - \text{third threshold}) \quad (16)$$

Note that when the edge amount=third threshold, Ce=0; when the edge amount=fourth threshold, Ce=1.

In step S914, the CPU 211 calculates a replacement level using the pixel value at the replacement pixel position determined in step S911. More specifically, the CPU 211 extracts RGB values at the replacement pixel position determined in step S911 from the RGB 7×7 regions set in step S902. Let N0 be the value of the pixel of interest, C0 be the pixel value at the replacement pixel position, and ΔC be the replacement level. Then, the CPU 211 can calculate ΔC using:

$$\Delta C = C0 - N0 \quad (17)$$

where ΔC, C0, and N0 are matrices having R, G, and B as elements.

In step S915, the CPU 211 adjusts the replacement amount ΔC calculated in step S914 by the replacement intensity Cz set in step S912. The CPU 211 calculates an adjusted replacement amount ΔCz using:

$$\Delta Cz = Cz \times \Delta C \quad (18)$$

where ΔCz is a matrix having R, G, and B as elements.

In step S916, the CPU 211 adjusts the replacement amount ΔCz calculated in step S915 by the replacement intensity Ce set in step S913. The CPU 211 calculates an adjusted replacement amount iCe using:

$$\Delta Ce = Ce \times \Delta Cz \quad (19)$$

where ΔCe is a matrix having R, G, and B as elements.

In step S917, the CPU 211 executes pixel value replacement by adding the replacement amount ΔCe calculated in step S916 to the pixel value N0 of the pixel of interest to calculate a value Nc of the pixel of interest, which has undergone edge emphasis, using:

$$Nc = N0 + \Delta Ce \quad (20)$$

where Nc is a matrix having R, G, and B as elements. Note that processing for clipping the Nc value within a desired range may be inserted.

As described above, in the MFP according to the first embodiment, the edge emphasis technique that can eliminate image deterioration of a digital image can be provided. More specifically, excessive correction can be avoided for an output device represented by an ink-jet printer, which has ink bleed as its print characteristics, thus obtaining a high-quality output image. Furthermore, since the correction table can be changed in accordance with the types of print media and inks, correction can be made in consideration of print characteristics based on various print media and inks, and a high-quality output result can be obtained in accordance with various combinations of print media and inks.

(Modification)

The first embodiment has explained the method of adjusting the intensity of the edge processing based on the output device characteristics such as the print medium type, ink type, and the like. However, adjustment need not always be done based only on the output device characteristics. For example, the intensity of the edge processing may be adjusted based on a user's instruction. That is, the present invention may adopt a configuration that designates the character line width in a printed image based on user's choice in, e.g., a character document image.

Figure 18:
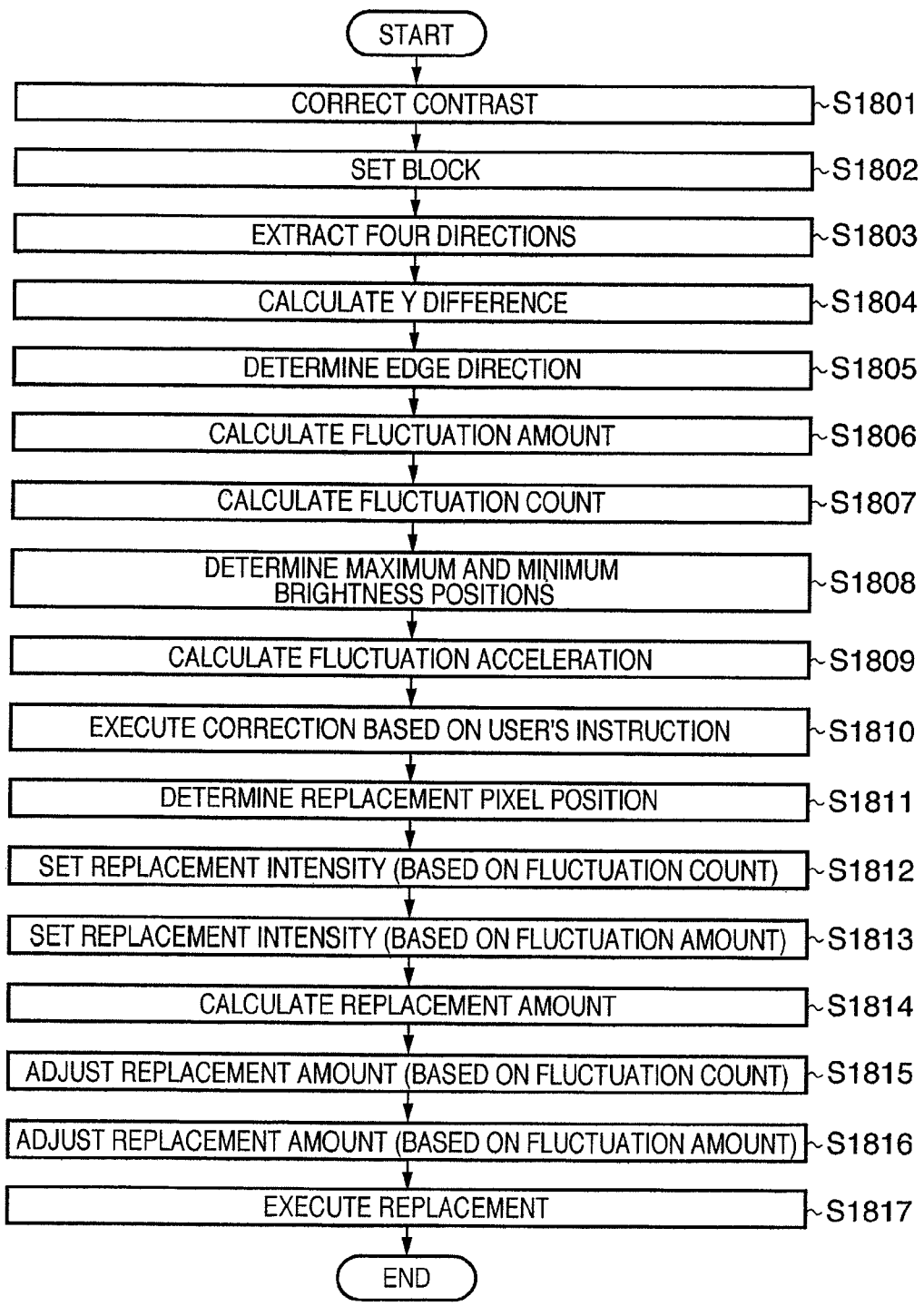
FIG. 18 is a detailed flowchart of an edge processing operation according to a modification.

FIG. 18 is a detailed flowchart of the edge processing operation according to a modification. Step S1810 as that different from FIG. 9 will be described below. Assume that the user selects and sets five different character line width designations in advance in the image processor of the MFP 100 prior to the beginning of this flowchart.

In step S1810, the CPU 211 adjusts the Lap(i) value calculated in step S1808 based on the output device characteristics. This modification will explain an example in which the character line width is designated as the output device characteristics. That is, this modification supports adjustment of ink bleed depending on the character line width. The CPU 211 derives an adjusted fluctuation acceleration Lap'(i) by:

$$Lap'(i) = Lap(i) + \text{DEVICE(selected character line width)} \quad (21)$$

where DEVICE(selected character line width) is a function of the adjustment amount depending on the character line width.

That is, the CPU 211 derives Lap'(i) by adding an adjustment amount, which is determined in advance for each character line width, to Lap(i) calculated in step S1809.

FIG. 17 is a table showing adjustment amounts (Lap change amounts) corresponding to respective character line widths. That is, FIG. 17 shows the adjustment amounts corresponding to dot sizes determined depending on the character line widths and ink types set in the printer. When this adjustment amount assumes a larger value, the pixel value is corrected to the smaller brightness value side in step S1815 to be described later. That is, the edge part is more likely to whiten. As a result, a thin character is printed.

Note that correction may be made by combining the first embodiment, i.e., the table of print medium types. An arithmetic expression at that time is described by:

$$Lap'(i) = Lap(i) + \text{DEVICE(print medium type)} + \text{DEVICE(user selected value)} \quad (22)$$

Since each correction amount of this embodiment is a scalar quantity expressed by DEVICE( ) a plurality of correction tables can be independently processed to apply correction. With the aforementioned correction processing, the line width of a character to be printed can be changed based on a user's instruction.

(Other Embodiments)

The embodiments of the present invention have been explained in detail. The present invention may be applied to either a system constituted by a plurality of devices, or an apparatus consisting of a single device.

Note that the present invention is also achieved by directly or remotely supplying a program that implements the functions of the aforementioned embodiments to a system or apparatus, and reading out and executing the supplied program code by a computer of that system or apparatus. Therefore, the technical scope of the present invention includes the program code itself installed in a computer to implement the functional processes of the present invention using the computer.

In this case, the form of program is not particularly limited, and an object code, a program to be executed by an interpreter, script data to be supplied to an OS, and the like may be used as long as they have the program function.

As a recording medium for supplying the program, for example, a Floppy® disk, hard disk, optical disk (CD, DVD), and magneto-optical disk, magnetic tape, nonvolatile memory card, ROM, and the like may be used.

As another program supply method, the program may be supplied as follows. That is, a connection is established to a homepage on the Internet using a browser of a client computer, and the program itself according to the present invention or a compressed file that includes an automatic installation function may be downloaded to a recording medium such as a hard disk or the like. Also, the program code that forms the program of the present invention may be segmented into a plurality of files, which may be downloaded from different homepages. That is, the claims of the present invention include a WWW server which makes a plurality of users download a program required to implement the functional processes of the present invention by the computer.

A storage medium such as a CD-ROM or the like, which stores the encrypted program of the present invention, may be delivered to the users. The user who has cleared a predetermined condition may be allowed to download key information that decrypts the program from a homepage via the Internet, and the encrypted program may be executed using that key information to be installed on a computer, thus implementing the present invention.

Moreover, the functions of the aforementioned embodiments can be implemented not only by executing the readout program by the computer but also by some or all of actual processes executed by an OS or the like which runs on a computer based on instructions of the program.

In addition, the functions of the aforementioned embodiments can also be implemented by some or all of actual processes executed by a CPU equipped on a function expansion board or unit, which is inserted in or connected to the computer, based on instruction of the program read out from the recording medium, after the program is written in a memory equipped on the function expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-184846, filed Jul. 4, 2006, which is hereby incorporated by reference herein, in its entirety.

What is claimed is:

1. An image processing apparatus comprising:
an acquiring unit configured to acquire a print characteristic based on at least one of information indicating the type of a print medium used to print and information indicating the type of ink used to print;
a region setting unit configured to set a region configured by a plurality of pixels in image data, the plurality of pixels including a pixel of interest, and each of the plurality of pixels having signal values corresponding to a plurality of colors;
a brightness value derivation unit configured to derive, for each of the plurality of pixels, a brightness value from the signal values corresponding to the plurality of colors;
a first determination unit configured to determine an edge direction of the set region based on the brightness values for the plurality of pixels within the set region, wherein the first determination unit determines the edge direction by:
deriving a first derivative of the brightness value at the pixel of interest in each of predetermined directions based on the brightness values for the plurality of pixels within the set region;
selecting a direction which has a maximum first derivative from among the predetermined directions;
a second determination unit configured to determine a replacement candidate pixel from among the plurality of pixels which include the pixel of interest and line up in the edge direction based on the brightness values for the plurality of pixels and the print characteristic, wherein the second determination unit determines the replacement candidate pixel by:
deriving a second derivative of the brightness value at the pixel of interest based on the first derivative; and
correcting the second derivative based on the print characteristic; and
a replacement unit configured to replace the signal values of the pixel of interest by a replacement signal value calculated based on at least one of the signal values of the replacement candidate pixel and the signal values of the pixel of interest.

2. An image processing method for an image processing apparatus, the method comprising:
acquiring a print characteristic based on at least one of information indicating the type of print medium used to print and information indicating the type of ink used to print;
setting a region configured by a plurality of pixels in image data, the plurality of pixels including a pixel of interest, and each of the plurality of pixels having signal values corresponding to a plurality of colors;
deriving, for each of the plurality of pixels, a brightness value from the signal values corresponding to the plurality of colors;
determining an edge direction of the set region based on the brightness values for the plurality of pixels within the set region, wherein the determining step determines the edge direction by:
deriving a first derivative of the brightness value at the pixel of interest in each of predetermined directions based on the brightness values for the plurality of pixels within the set region; and
selecting a direction which has a maximum first derivative from among the predetermined directions;
determining a replacement candidate pixel from among the plurality of pixels which include the pixel of interest and line up in the edge direction based on the brightness values for the plurality of pixels and the print characteristic, wherein the replacement candidate pixel determining step determines the replacement candidate pixel by:
deriving a second derivative of the brightness value at the pixel of interest based on the first derivative; and
correcting the second derivative based on the print characteristic; and
replacing the signal values of the pixel of interest by a replacement signal value calculated based on at least one of the signal values of the replacement candidate pixel and the signal values of the pixel of interest.

3. A non-transitory computer-readable storage medium storing an executable program for making a computer execute an image processing method according to claim 2.

4. The image processing apparatus according to claim 1, wherein the second determination unit detects the pixel corresponding to an edge portion within the set region based on the brightness values for the plurality of pixels, and determines the replacement candidate pixel so that the edge portion will be emphasized.

5. The image processing apparatus according to claim 4, wherein the second determination unit corrects the position of the detected pixel based on the print characteristic.

6. The image processing apparatus according to claim 1, wherein the signal values corresponding to the plurality of colors are RGB values.

7. An inkjet printing apparatus comprising:
the image processing apparatus according to claim 1; and
a printing unit configured to print the processed image data to a print medium using an ink.

8. The image processing apparatus according to claim 1, wherein the first determination unit determines a direction, which is defined by linking two pixels whose difference of brightness becomes a maximum, as the edge direction.

9. The image processing apparatus according to claim 1, wherein the second determination unit determines the replacement candidate pixel by further:
determining a pixel, which has a minimum brightness value in the plurality of pixels which line up in the edge direction, as the replacement candidate pixel when the corrected second derivative is a positive value; and
determining a pixel, which has a maximum brightness value in the plurality of pixels which line up in the edge direction, as the replacement candidate pixel when the corrected second derivative is a negative value.

10. The image processing apparatus according to claim 1, wherein the replacement unit calculates the replacement signal value by:

determining an interpolation strength based on the first derivative for the plurality of pixels which line up in the edge direction; and interpolating the signal values of the replacement candidate pixel and the signal values of the pixel of interest based on the determined interpolation strength.

11. The inkjet printing apparatus according to claim 7 further comprising:

a scanning unit configured to scan an image and to acquire the image data.

* * * * *